(12) United States Patent
Zhong

(10) Patent No.: US 12,240,518 B2
(45) Date of Patent: Mar. 4, 2025

(54) BABY STROLLER WITH A FOLDING MECHANISM TRIGGERED BY A CHILD CARRIER

(71) Applicant: Wonderland Switzerland AG, Steinhausen (CH)

(72) Inventor: Zhi-Ren Zhong, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/373,948

(22) Filed: Sep. 27, 2023

(65) Prior Publication Data

US 2024/0017760 A1 Jan. 18, 2024

Related U.S. Application Data

(63) Continuation of application No. 16/387,556, filed on Apr. 18, 2019, now Pat. No. 11,807,289.

(30) Foreign Application Priority Data

Apr. 19, 2018 (CN) .......................... 201810356058.8

(51) Int. Cl.
*B62B 9/00* (2006.01)
*B62B 7/06* (2006.01)
(Continued)

(52) U.S. Cl.
CPC ................ *B62B 9/00* (2013.01); *B62B 7/064* (2013.01); *B62B 7/08* (2013.01); *B62B 7/145* (2013.01)

(58) Field of Classification Search
CPC ........... B62B 7/064; B62B 7/08; B62B 7/145; B62B 7/142; B62B 7/062; B62B 7/105; B62B 9/00; B62B 9/102; B62B 2205/20
See application file for complete search history.

(56) References Cited

U.S. PATENT DOCUMENTS

| | | | |
|---|---|---|---|
| 8,870,215 B2 | 10/2014 | Li | |
| 9,517,786 B2 | 12/2016 | Chang | |

(Continued)

FOREIGN PATENT DOCUMENTS

| | | |
|---|---|---|
| CN | 201347114 Y | 11/2009 |
| DE | 10 2016 217 382 A1 | 3/2017 |

(Continued)

OTHER PUBLICATIONS

"International Search Report" mailed on Aug. 30, 2019 for International application No. PCT/EP2019/060177, International filing date: Apr. 18, 2019.

(Continued)

*Primary Examiner* — Steve Clemmons
(74) *Attorney, Agent, or Firm* — Volpe Koenig

(57) ABSTRACT

A baby stroller is provided and includes a stroller frame and a child carrier. The stroller frame includes two supports, a first fixing component, a second fixing component and a locking component. The first fixing component and the second fixing component are fixed on one and the other one of the two supports, respectively, and pivotally connected to each other. The locking component is movably disposed on the first fixing component and configured to engage with the second fixing component for restraining a folding action of the stroller frame. The child carrier is disposed on the stroller frame and pivotable relative to the stroller frame. The child carrier is for providing a releasing force to the locking component for disengaging the locking component from the second fixing component to allow the folding action of the stroller frame during a pivotal movement of the child carrier relative to the stroller frame.

26 Claims, 31 Drawing Sheets

(51) Int. Cl.
  *B62B 7/08*   (2006.01)
  *B62B 7/14*   (2006.01)

(56) References Cited

U.S. PATENT DOCUMENTS

| | | | |
|---|---|---|---|
| 10,836,419 | B2 | 11/2020 | Oakes |
| 2001/0013689 | A1 | 8/2001 | Cone et al. |
| 2007/0096434 | A1 | 5/2007 | Haeggberg |
| 2010/0025968 | A1 | 2/2010 | Fritz |
| 2015/0291200 | A1 | 10/2015 | Taylor |
| 2017/0297600 | A1 | 10/2017 | Zhong |

FOREIGN PATENT DOCUMENTS

| | | | | | |
|---|---|---|---|---|---|
| EP | 1 982 895 | A2 | | 10/2008 | |
| EP | 1 982 895 | A3 | | 9/2010 | |
| EP | 2 832 625 | A2 | | 2/2015 | |
| GB | 2496756 | A | | 5/2013 | |
| GB | 2544377 | | | 5/2017 | |
| GB | 2544377 | A | * | 5/2017 | ............... B62B 7/06 |
| JP | 2018-34684 | A | | 3/2018 | |
| KR | 102455984 | B1 | | 10/2022 | |
| WO | 2017/009345 | A1 | | 1/2017 | |

OTHER PUBLICATIONS

"International Search Report" mailed on Dec. 16, 2019 for International application No. PCT/EP2019/060177, International filing date: Apr. 18, 2019.

"Notice of Allowance Issued in Corresponding Korean Patent Application No. 10-2023-7045107", Mailed Date: Dec. 19, 2024, 6 pages.

\* cited by examiner

BABY STROLLER WITH A FOLDING MECHANISM TRIGGERED BY A CHILD CARRIER

CROSS REFERENCE TO RELATED APPLICATIONS

This application is a continuation application of U.S. application Ser. No. 16/387,556, filed on Apr. 18, 2019. The content of the application is incorporated herein by reference.

BACKGROUND OF THE INVENTION

1. Field of the Invention

The present invention relates to a child product, and more particularly, to a baby stroller, which has a folding mechanism triggered by a child carrier and allows a folding action of a stroller frame during a pivotal movement of the child carrier.

2. Description of the Prior Art

A stroller is indispensable for a family who has an infant or a child. The stroller can not only provide a safe and comfortable environment for the infant or the child but also bring convenience for a caregiver to carry the infant or the child when travelling. The stroller usually has foldable structure, so that the stroller can be folded to reduce an occupied space of the stroller when transportation or storage of the stroller.

The stroller usually includes a stroller frame and a seat installed on the stroller frame. The stroller frame is an essential structure of the stroller for providing support for other components or a carrier, such as the seat, the bassinet or an infant car seat. The carrier is for providing a sitting space for the infant or the child. Currently, there are two main types of foldable strollers available on the market. Firstly, the carrier is detachable from the stroller frame, and the stroller frame can be unlocked for allowing a folding action of the stroller frame after detachment of the seat. Secondly, the carrier is pivotally foldable, and the stroller frame can be unlocked for allowing the folding action of the stroller frame after a pivotal movement of the seat. However, the aforementioned foldable strollers require independent operations of the stroller frames and the seats while folding the strollers, and it is not convenient in use.

Therefore, there is a need to provide a stroller which has a folding mechanism triggered by a child carrier and allows a folding action of a stroller frame during a pivotal movement of the child carrier.

SUMMARY OF THE INVENTION

It is an objective of the present invention to provide a baby stroller with folding mechanism for solving the aforementioned problem, which has a folding mechanism triggered by a child carrier and allows a folding action of a stroller frame during a pivotal movement of the child carrier.

In order to achieve the aforementioned objective, the present invention discloses a baby stroller. The baby stroller includes a stroller frame and a child carrier. The stroller frame includes at least two supports, a first fixing component, a second fixing component and a locking component. The first fixing component is fixed on one of the at least two supports. The second fixing component is fixed on another one of the at least two supports and pivotally connected to the first fixing component. The locking component is movably disposed on the first fixing component and configured to engage with the second fixing component for restraining a folding action of the stroller frame. The child carrier is disposed on the stroller frame and pivotable relative to the stroller frame. The child carrier is for providing a releasing force to the locking component for disengaging the locking component from the second fixing component to allow the folding action of the stroller frame during a pivotal movement of the child carrier relative to the stroller frame.

According to an embodiment of the present invention, the stroller frame further includes a releasing portion disposed on a surface of the stroller frame and corresponding to the locking component. The releasing portion is for receiving the releasing force and for transmitting the releasing force to the locking component to drive the locking component to disengage from the second fixing component when the releasing portion receives the releasing force.

According to an embodiment of the present invention, the releasing portion includes a driving component disposed on the surface of the stroller frame and corresponding to the locking component for receiving the releasing force and for transmitting the releasing force to the locking component to drive the locking component to disengage from the second fixing component when the releasing portion receives the releasing force.

According to an embodiment of the present invention, the stroller frame further includes at least one linking element disposed between the locking component and the driving component for receiving the releasing force transmitting from the driving component and for transmitting the releasing force to the locking component to drive the locking component to disengage from the second fixing component.

According to an embodiment of the present invention, at least one driven slanted surface is formed on the driving component, and the child carrier pushes the driving component by cooperation of the child carrier and the at least one driven slanted surface.

According to an embodiment of the present invention, the stroller frame further includes a child carrier mount for allowing the child carrier to be mounted thereon, and the driving component is movably disposed on the child carrier mount and located beneath the child carrier.

According to an embodiment of the present invention, the releasing portion further includes a releasing component disposed on the child carrier mount and corresponding to the locking component for receiving the releasing force and for transmitting the releasing force to the locking component to drive the locking component to disengage from the second fixing component for allowing the folding action of the stroller frame when the releasing component receives the releasing force.

According to an embodiment of the present invention, the baby stroller further includes an operating component. The releasing component includes a fixing end for allowing the operating component to be connected thereto. The operating component is for providing the releasing force to the locking component by the releasing component for allowing the folding action of the stroller frame when the child carrier does not rotate relative to the stroller frame.

According to an embodiment of the present invention, the releasing component is pivotally disposed on the child carrier mount, and the driving component is slidably disposed on the child carrier mount and partially located inside the child carrier mount.

According to an embodiment of the present invention, the locking component is pivotally disposed on the first fixing component, and a pivoting axis of the releasing component is perpendicular to a pivoting axis of the locking component.

According to an embodiment of the present invention, a driving inclined surface is formed on an end of the driving component for pushing the locking component to disengage the locking component from the second fixing component.

According to an embodiment of the present invention, an inclined portion is formed on the locking component and bent toward the driving component for cooperating with the driving inclined surface.

According to an embodiment of the present invention, the stroller frame further includes a resilient component for biasing the locking component to engage with the second fixing component.

According to an embodiment of the present invention, the locking component is pivotally disposed on the first fixing component, and the child carrier is for providing the releasing force to the locking component, such that the locking component disengages from the second fixing component in a swinging manner.

According to an embodiment of the present invention, an engaging portion protrudes from the second fixing component, and an engaging notch is formed on the locking component for engaging with the engaging portion.

According to an embodiment of the present invention, the locking component is slidably disposed on the first fixing component, and the child carrier is for providing the releasing force to the locking component, such that the locking component disengages from the second fixing component in a sliding manner.

According to an embodiment of the present invention, the stroller frame further comprises at least one linking element slidably disposed on the first fixing component, and the locking component is at least partially disposed inside the at least one linking element and slidable relative to the first fixing component by the at least one linking element.

According to an embodiment of the present invention, an unfolding engaging slot is formed on the second fixing component for allowing the locking component to insert therein, and the locking component is aligned with the unfolding engaging slot when the stroller frame is unfolded to an unfolded state.

According to an embodiment of the present invention, a folding engaging slot is formed on the second fixing component for allowing the locking component to insert therein, and the locking component is aligned with the folding engaging slot when the stroller frame is folded to a folded state.

According to an embodiment of the present invention, a pushing slanted surface is formed on an inner periphery of the folding engaging slot for pushing the locking component.

In contrast to the prior art, the present invention utilizes the child carrier allows the folding action of the stroller frame during the pivotal movement of the child carrier relative to the stroller frame. Therefore, the stroller frame is allowed to be folded when the child carrier is mounted on and pivotally folded, and there is no need of independent operations of the stroller frame and the child carrier while folding the stroller, which provides a convenient way for a user to fold the stroller frame and the child carrier together.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a baby stroller which utilizes a child carrier disposed on the stroller frame to allow a folding action of a stroller frame, so as to achieve a purpose of easy folding operation. Specifically, the child carrier is able to pivot relative to the stroller frame when the child carrier is disposed on the stroller frame. A locking component of the stroller frame can be released to allow the folding action of the stroller frame by the child carrier during a pivotal movement of the child carrier relative to the stroller frame. Detailed description of the stroller of the present invention is provided as follows.

Figure 1:
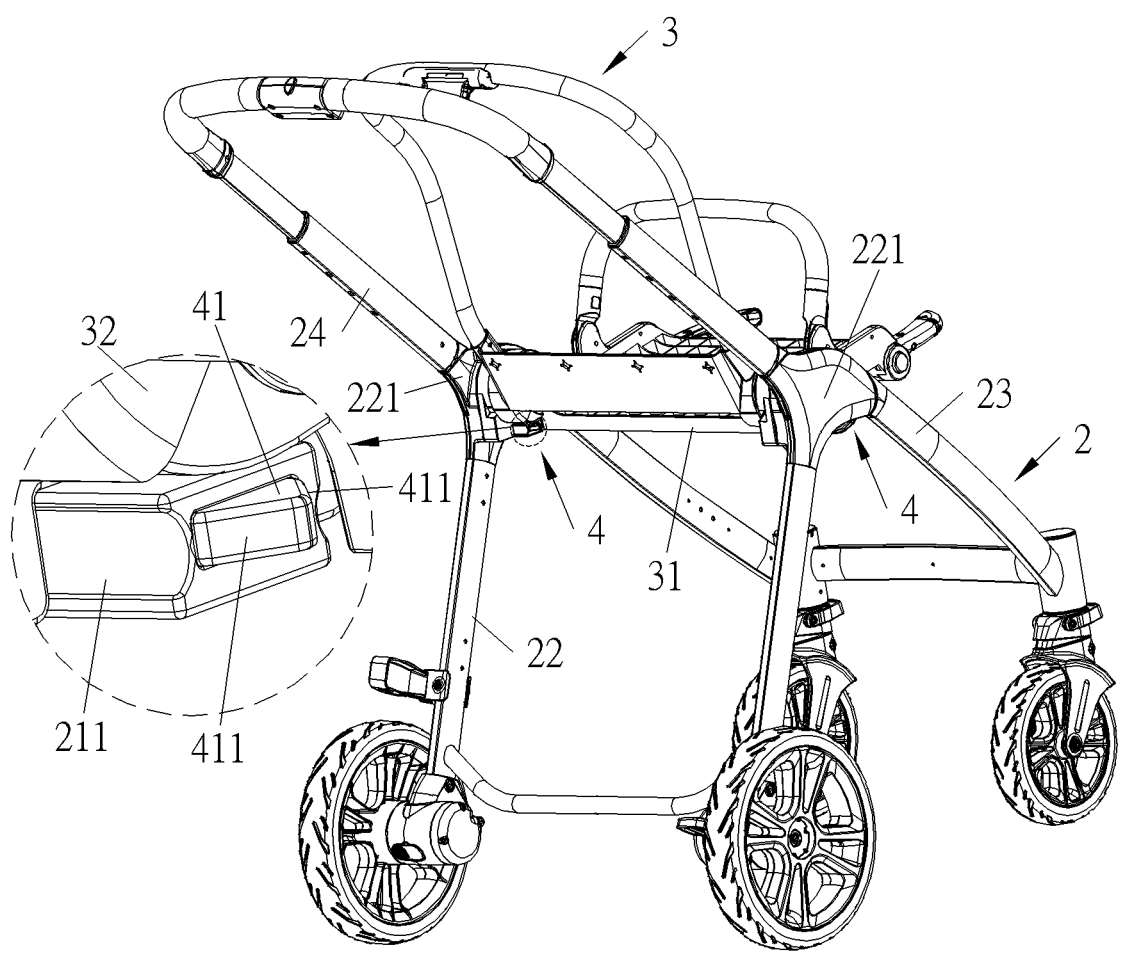
FIG. 1 is a schematic diagram of a baby stroller according to a first embodiment of the present invention.
Figure 2:
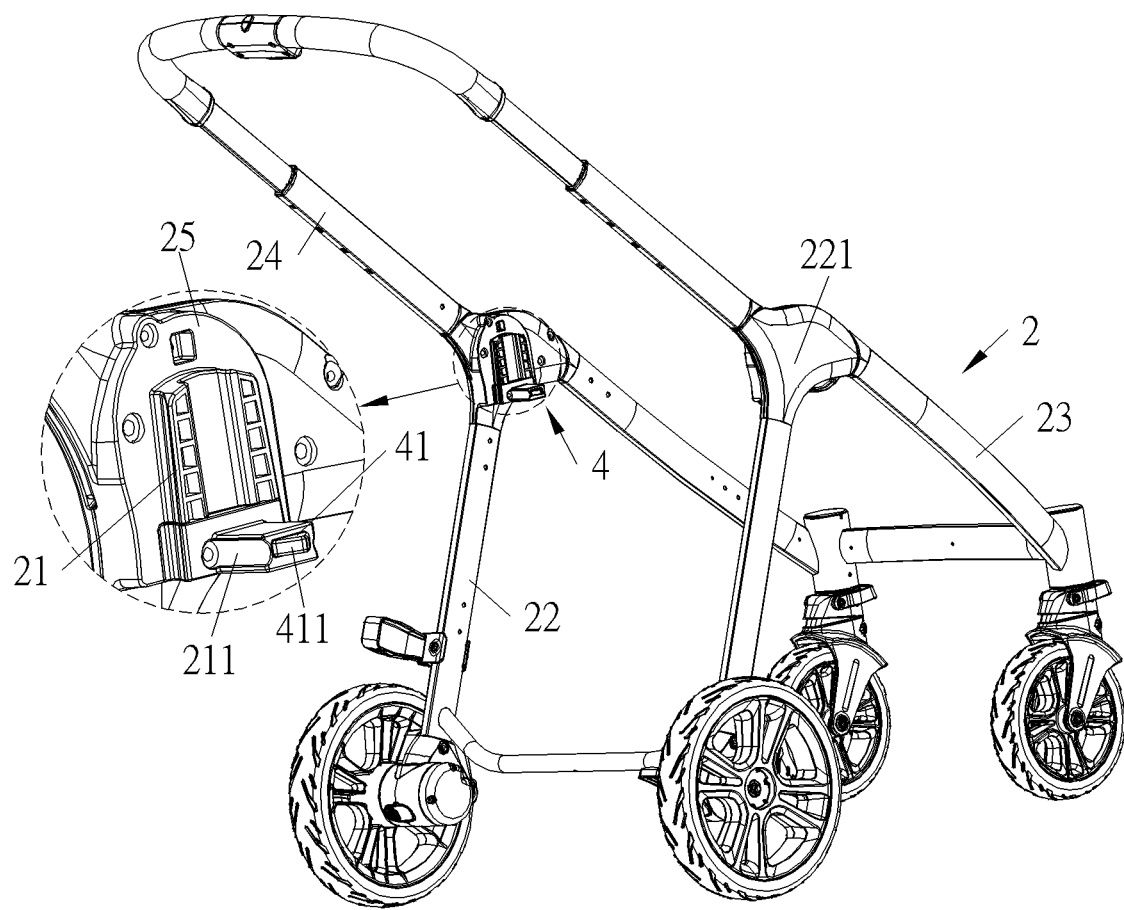
FIG. 2 is a partial diagram of a baby stroller according to the first embodiment of the present invention.

Please refer to FIG. 1 and FIG. 2. FIG. 1 is a schematic diagram of a baby stroller 1 according to a first embodiment of the present invention. FIG. 2 is a partial diagram of the baby stroller 1 according to the first embodiment of the present invention. As shown in FIG. 1 and FIG. 2, the baby stroller 1 includes a stroller frame 2 and a child carrier 3. The stroller frame 2 includes a locking component for restraining a folding action of the stroller frame 2 in an unfolded state. The locking component can be disposed within the interior or on an outer surface of the stroller frame 2 for restraining movement of at least part of the stroller frame 2, so as to restrain the folding action of the stroller frame in the unfolded state. The child carrier 3 is disposed on the stroller frame 2 and can be positioned or pivoted relative to the stroller frame 2 for adjusting a using angle or a using state of the child carrier 3 relative to the stroller frame according to practical using demands. Furthermore, when the child carrier 3 pivots relative to the stroller frame 2, the child carrier 3 can provide a releasing force to the locking component for driving the locking component to move, so as to allow the folding action of the stroller frame.

Figure 3:
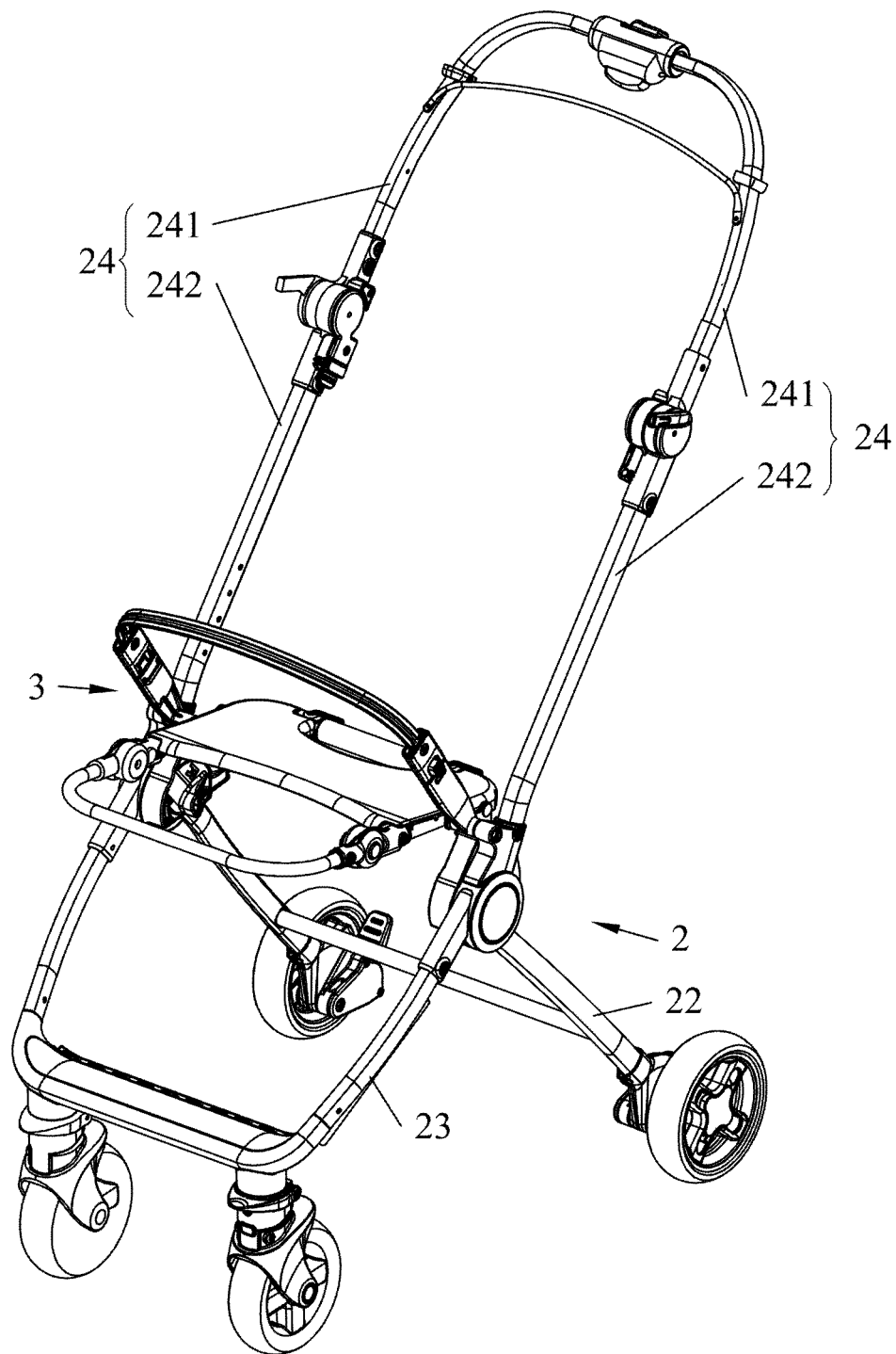
FIG. 3 is a schematic diagram of a baby stroller according to another embodiment of the present invention.

The stroller frame mainly includes a front support connected to front wheels, a rear support connected to rear wheels, and a handle support connected to handles. However, it is not limited thereto. For example, please refer to FIG. 3. FIG. 3 is a schematic diagram of a baby stroller 1' according to another embodiment of the present invention. As shown in FIG. 3, in this embodiment, the handle support 24 of the baby stroller 1' can further include an upper handle supporting component 241 and a lower handle supporting component 242, and the upper supporting component 241 is foldable relative to the lower handle supporting component 242, so as to reduce an occupied space of the stroller frame in a folded state.

The number and the configuration of the locking component can be determined according to the configuration of the stroller frame. For example, the locking component can be disposed between the front support and the handle support, or disposed on a central hub connected to the front support, the rear support and the handle support for restraining a movement of one of the front support, the rear support and the handle support relative to another, so as to restrain the folding action of the stroller frame. Furthermore, the stroller frame can include more than one locking component. For example, as shown in FIG. 3, in this embodiment, the stroller frame 2 can include two locking components for restraining the folding action of the stroller frame. One of the two locking components is disposed between the upper handle supporting component 241 and the lower handle supporting component 242 of the handle support 24 for restraining a folding action of the upper handle supporting component 241 and the lower handle supporting component 242. The other one of the two locking components is disposed between the lower handle supporting component 242 and the front support 23 for restraining a folding action of the lower handle supporting component 242 relative to the front support 23. No matter how many locking components are disposed on the stroller frame, during the pivotal movement of the child carrier, the child carrier can selectively provide the releasing force to one or more of the locking components for allowing the folding action of the stroller frame if there are more than one locking components in the stroller frame.

Besides, the structure of the locking component also can be determined according to the structure of the stroller frame. For example, in an embodiment, if the stroller frame is provided with a slot, the locking component can include a protrusion whose size is corresponding to a size of the slot for engaging with the slot at a locking position. Alternatively, in another embodiment, if the stroller frame is provided with a protruding portion protruding outwardly, the locking component can include a hook component for engaging with the protruding portion at the locking position.

According to the above mentioned, for example, the locking component can be a latch component, a hook component or a pin. However, it is not limited thereto. Any structure which can be engaged at the locking position for restraining the folding action of the stroller frame can be included within the scope of the invention. Furthermore, for example, the stroller frame further includes an anchoring component, a slot or an accommodating space for engaging with the locking component at the locking position. However, it is not limited thereto. Any structure which can engage with the locking component at the locking position can be included within the scope of the present invention.

In order to secure engagement of the locking component, the stroller frame can further include a resilient component abutting against the locking component for biasing the locking component to be engaged at the locking position. Due to such configuration, the releasing force has to overcome a resilient force of the resilient component, so as to drive the locking component to depart from the locking position, which enhances stability of the structure of the stroller frame.

As mentioned above, the number, the configuration and the structure of the locking component can be determined according to the configuration and the structure of the stroller frame. Furthermore, the locking component can be disposed within the interior or on the outer surface of the stroller frame according to requirement of the appearance and the fixing and folding operation of the stroller frame, or partially disposed within the interior of the stroller frame and partially exposed out of the outer surface of the stroller frame for providing design flexibility.

Figure 4A:
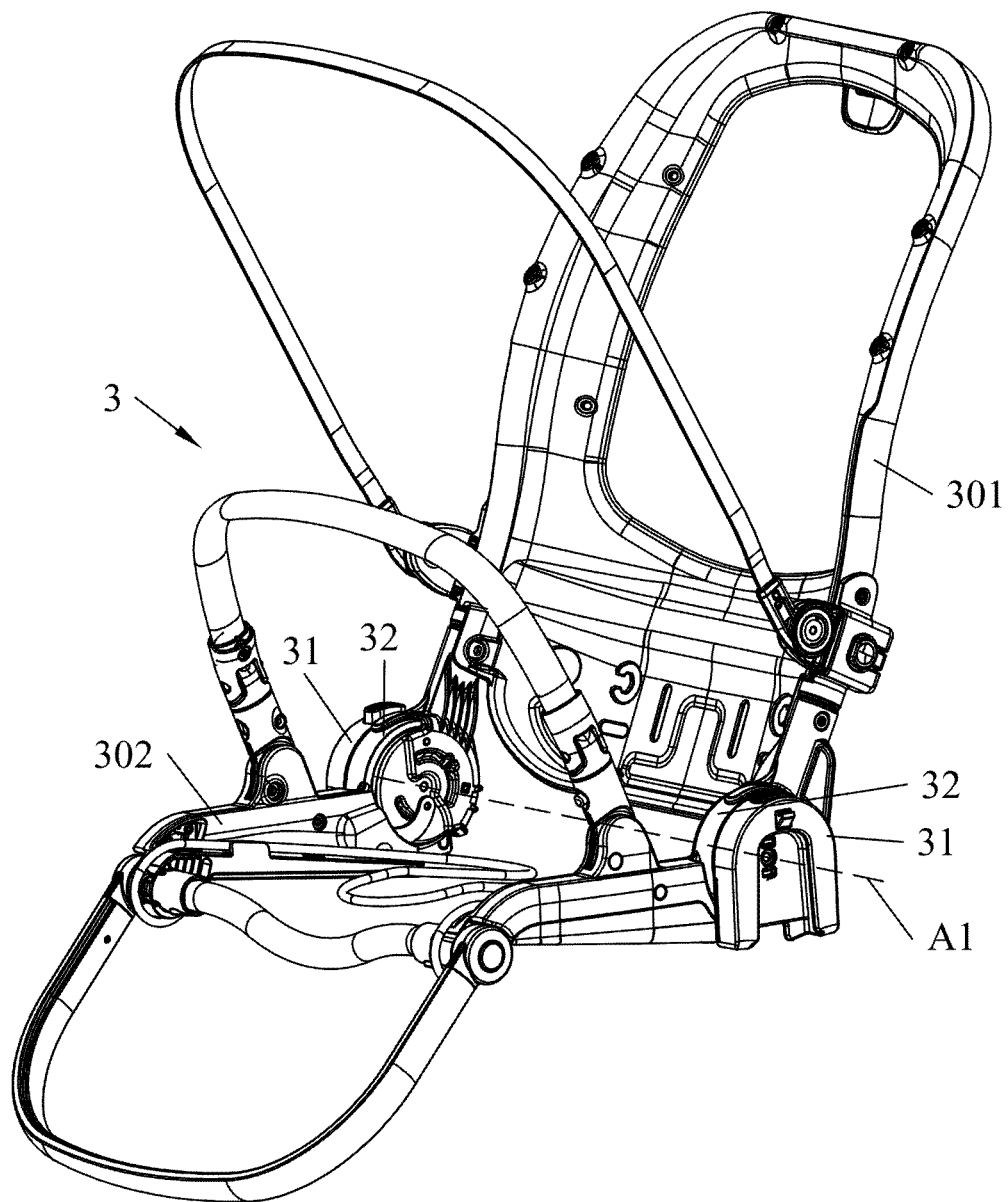
FIG. 4A to FIG. 4D are diagrams of a child carrier according to different embodiments of the present invention.
Figure 4B:
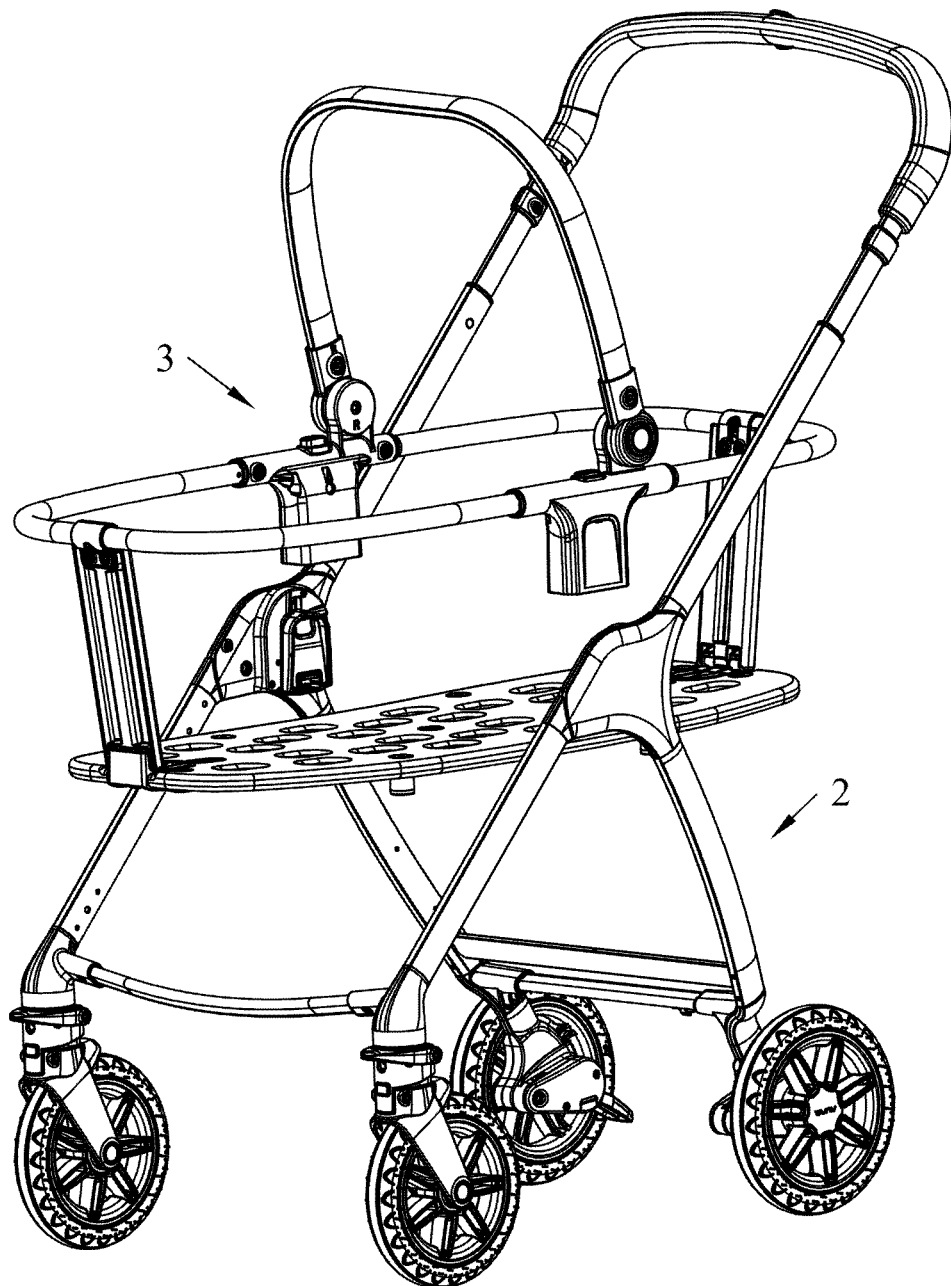
Figure 4C:
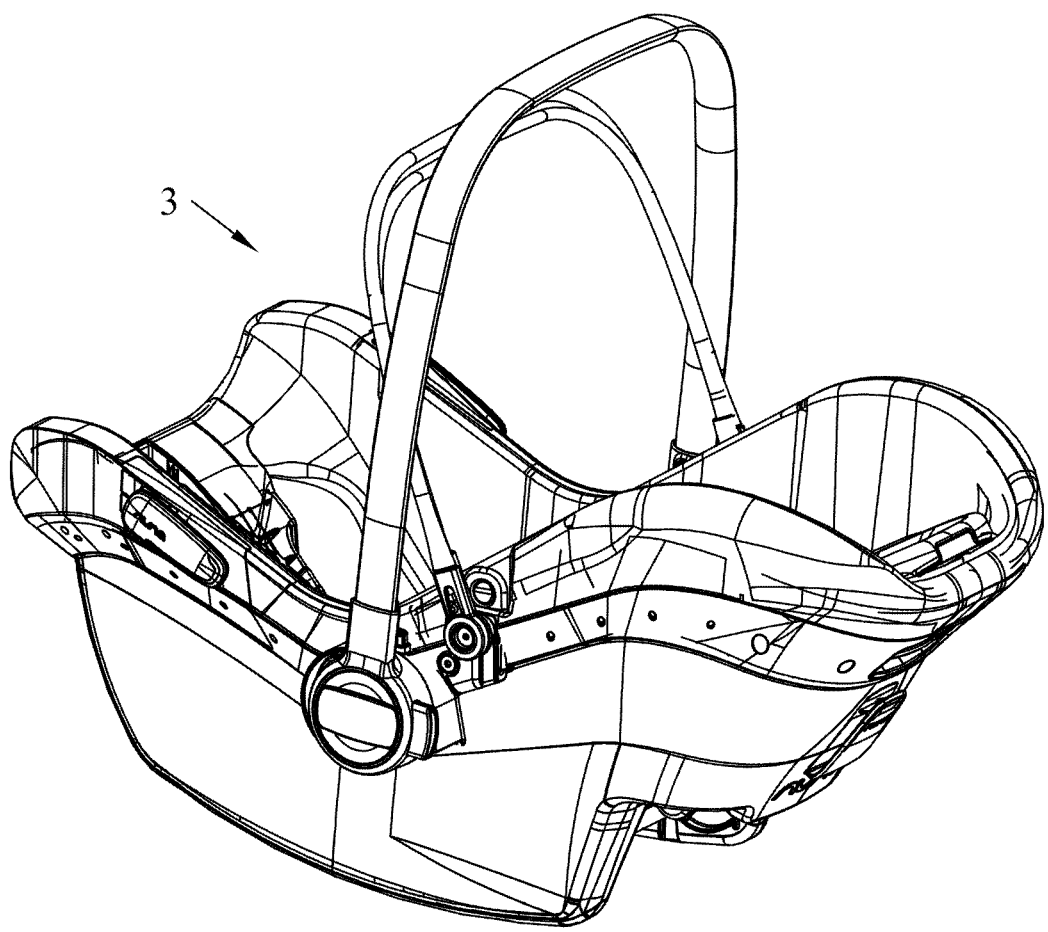
Figure 4D:
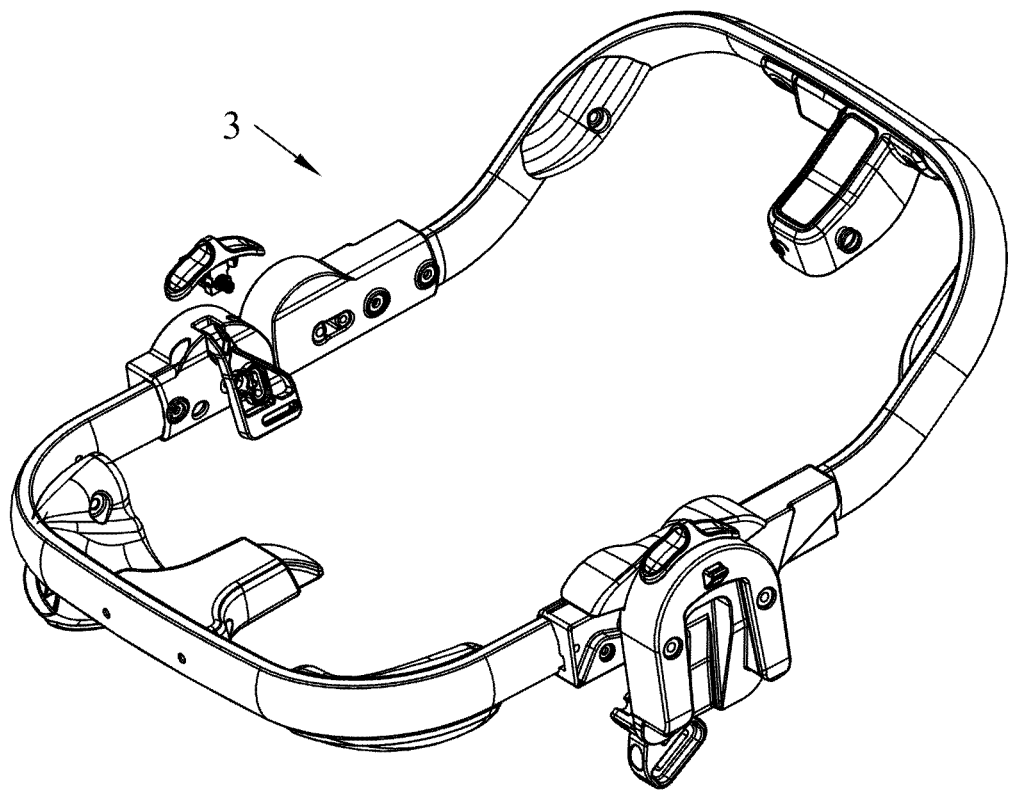

Please refer to FIG. 4A to FIG. 4D. FIG. 4A to FIG. 4D are diagrams of a child carrier XX according to different embodiments of the present invention. As shown in FIG. 4A to FIG. 4D, the child carrier 3 can be a carrier which is used for directly or indirectly supporting a child and disposed on the stroller frame. For example, the child carrier can be a stroller seat as shown in FIG. 4A, a bassinet as shown in FIG. 4B, an infant car seat as shown in FIG. 4C, or an adaptor as shown in FIG. 4D for supporting any of the aforementioned devices. However, it is not limited thereto. Any structure which can directly or indirectly support the child can be included within the scope of the invention.

Besides, after the child carrier 3 is disposed on the stroller frame, the using angle and the using state of the child carrier relative to the stroller frame can be adjusted. For example, if the child carrier is a stroller seat, an inclined angle of a backrest portion of the stroller seat can be adjusted according to practical demands. Alternatively, in another embodiment, the child carrier can be adjusted from a horizontal state parallel to a ground to a vertical state perpendicular to the ground by the pivotal movement of the child carrier when it is desired to fold the stroller. It should be noticed that the aforementioned adjustment can be achieved by pivoting the entire child carrier relative to the stroller frame or by pivoting a portion of the child carrier relative to another portion of the child carrier.

In the case that the entire child carrier is pivoted relative to the stroller frame, the child carrier can include a mounting element disposed on the stroller frame for providing a pivoting axis of the child carrier relative to the stroller frame, so that the child carrier can pivot relative to the stroller frame around the pivoting axis. Specifically, as shown in FIG. 1, FIG. 2 and FIG. 4A, the child carrier 3 can include a base 31, i.e., the mounting element, and the stroller frame 2 can include a child carrier mount 21 for allowing the base 31 to be mounted thereon. When the child carrier 3 is mounted on the stroller frame 2 by the base 31 and the child carrier mount 21, a pivoting axis A1 penetrating through the base 31, the child carrier mount 21, the stroller frame 2 and the child carrier 3 is provided. Besides, as shown in FIG. 4A, the child carrier 3 can further include a positioning mechanism, which includes a pivoting mechanism 32 disposed on a side of the base 31 which is away from a mounted side, so that the child carrier 3 is able to pivot relative to the stroller frame 2 around the pivoting axis A1 when the positioning mechanism is released or the pivoting mechanism 32 is pivoted. Alternatively, in another embodiment, the child carrier can be disposed on the stroller frame by at least two mounting elements for providing two different pivoting axes. When one mounting element is detached from the stroller frame, the child carrier can be driven to pivot relative to the stroller frame by releasing kinetic energy during detachment of the mounting element around the pivoting axis of the other mounting element.

On the other hand, as shown in FIG. 4A, in the case that the child carrier 3 includes different portions which can pivot relative to each other, e.g., the backrest portion 301 and the seat portion 302, a pivotal movement of one portion, e.g., the backrest portion 301, relative to another portion, e.g., the seat portion 302, can be used for releasing the locking component. Alternatively, in another embodiment, after the backrest portion is pivoted relative to the seat portion at a predetermined angle, the entire child carrier can be pivoted relative to the stroller frame to provide the releasing force to the locking component.

The child carrier provided in the present invention can provide the releasing force to the locking component during the pivotal moment of the child carrier, so as to allow the folding action of the stroller frame. However, the releasing force provided by the child carrier can be acted on the locking component directly or indirectly. Detailed description for the releasing force is provided as follows.

If the locking component is disposed on the outer surface of the stroller frame, or partially exposed out of the outer surface and partially disposed within the interior of the stroller frame, the child carrier can provide the releasing force to the locking component directly. For example, the child carrier can include an interacting component, e.g. a protruding block. The protruding block does not interfere with the pivotal movement of the child carrier before providing the releasing force to the locking component. Also, the locking component can be partially disposed within the interior of the stroller frame and partially exposed out of the outer surface, and includes an interacting portion exposed out of the outer surface for cooperating with the protruding block. For example, an upper portion of the locking component can include a pin disposed between the front support and the rear support for restraining movement of the front support relative to the rear support. A lower portion of the locking component includes a lever. A fulcrum of the lever is fixed on the stroller frame, and an extending end of the lever passes through a through hole formed on the stroller frame and exposed out of the outer surface of the stroller frame. The interacting portion is disposed on the extending end of the lever exposed of the outer surface of the stroller frame and located on a moving path of the protruding block. When the protruding block moves along with the pivotal movement of the child carrier, the protruding block can push the interacting portion to move inwardly, so as to drive the pin to move outwardly by the fulcrum, so that the movement of the front support relative to the rear support is allowed. Alternatively, in another embodiment, the locking component can include a hook component swinging left and right instead of the pin. Similarly, the fulcrum of the lever is fixed on the stroller frame, and the extending end of the lever passes through the through hole formed on the stroller frame and exposed out of the outer surface of the stroller frame. The interacting portion is disposed on the extending end of the lever exposed of the outer surface of the stroller frame and located on the moving path of the protruding block. When the protruding block moves along with the pivotal movement of the child carrier, the protruding block can push the interacting portion to move in a clockwise direction, so as to drive the hook component to move in the clockwise direction by the fulcrum, to depart from the locking position, so as to allow the folding action of the stroller frame.

Apart from providing the interacting component for providing the releasing force to the locking component directly, in an embodiment, the child carrier also can provide the releasing force to the locking component indirectly. For example, the baby stroller can include a connecting component disposed between the child carrier and the locking component. The connecting component can be a strap. An end of the strap is disposed on the child carrier, and another end of the strap is fixed on an end of the locking component extending outwardly and exposed out of the outer surface of the stroller frame. When the child carrier pivots relative to the stroller frame, the strap can be driven by the pivotal movement of the child carrier to pull the locking component to depart from the locking position, so as to allow the folding action of the stroller frame.

Furthermore, the releasing force can be transmitted to the locking component in an indirect way by any other component. In one embodiment of the present invention, if the locking component is disposed within the interior of the stroller frame, the stroller frame can further include a releasing portion disposed on the outer surface of the stroller frame and corresponding to the locking component for receiving the releasing force provided by the child carrier and for transmitting the releasing force to the locking component, so as to drive the locking component to move.

Figure 5A:
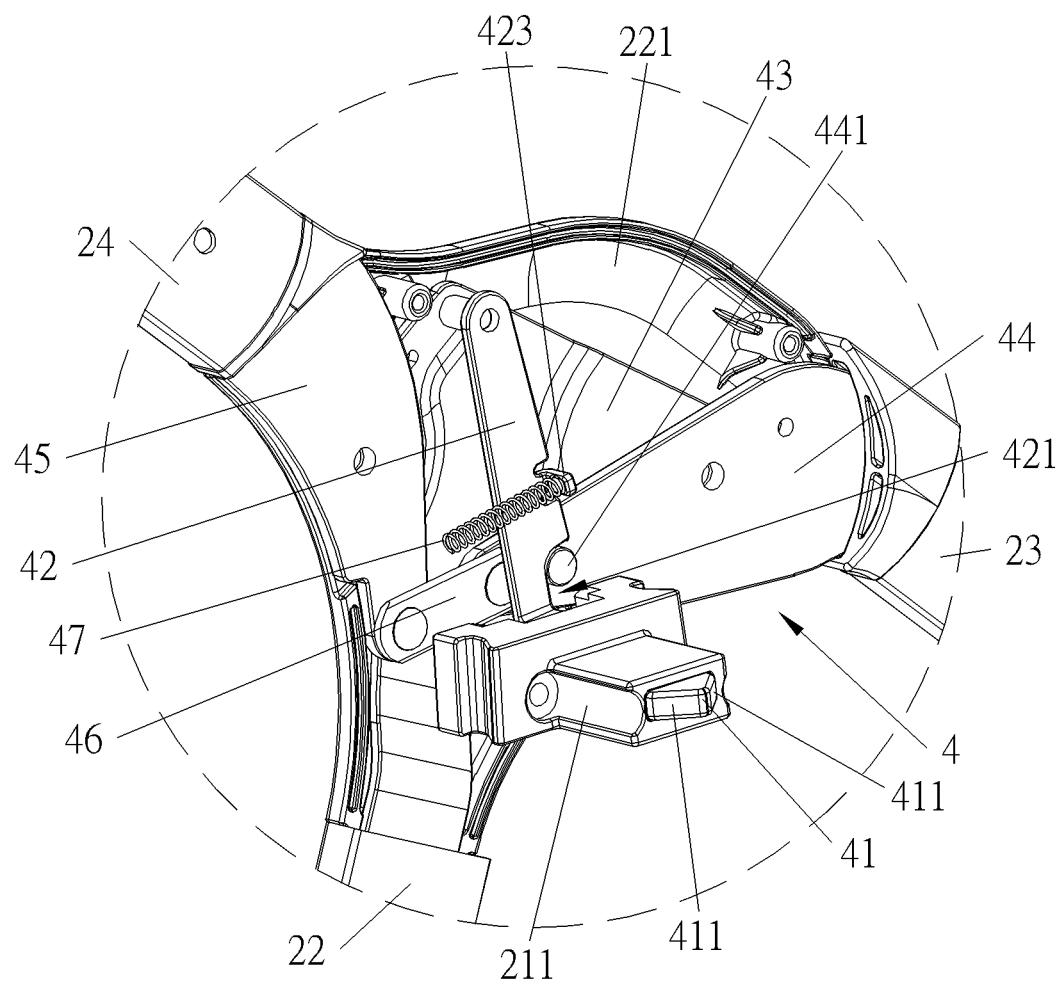
FIG. 5A to FIG. 5C are partial enlarged diagrams of the baby stroller according to the first embodiment of the present invention.

In the first embodiment provided in the present invention, please refer to FIG. 1, FIG. 2 and FIG. 5A, the releasing portion can include a driving component 41 disposed on the outer surface of the stroller frame 2 and corresponding to the locking component 42. An end of the driving component 41 is exposed out of the outer surface of the stroller frame 2, and another end of the driving component 41 contacts with the locking component 42 directly. When the child carrier 3 pivots relative to the stroller frame 2, the driving component 41 can be driven by the child carrier 3 or the interacting component (not shown) thereon to move, so as to drive the locking component 42 to depart from the locking position, which solves a problem of difficult access to the locking component disposed within the interior of the stroller frame. Furthermore, the driving component can include different types of structure. Any structure which can be driven by the child carrier or the interacting component to move to drive the locking component to depart from the locking position can be included within the scope of the present invention. For example, the driving component can be a pushing component, a rotating component, a lever switch, or a rocker type switch. However it is not limited thereto. If the driving component is a pushing component, the child carrier can push the pushing component during the pivotal moment of the child carrier. If the driving component is a rotating component, the child carrier can drive the rotating component to rotate during the pivotal moment of the child carrier. If the driving component is a lever switch or a rocker type switch, the child carrier can drive the driving component to pivot during the pivotal movement of the child carrier.

In order to facilitate transmission of the aforementioned movement and the releasing force, in an embodiment, please refer to FIG. 5A, at least one driven slanted surface 411 is formed on the driving component 41, so that the child carrier 3 to push the driving component 41 by cooperation of the child carrier 3 and the at least one driven slanted surface 411. Furthermore, if there are two driven slanted surfaces 411 respectively formed on two sides of the driving component 41, it allows the driving component 41 to be moved by the cooperation of the child carrier 3 and the corresponding driven slanted surface 411 during a forward pivotal movement of the child carrier 3 or a rearward pivotal movement of the child carrier 3.

Furthermore, in an embodiment, the stroller frame can further include a hollow guiding portion for allowing the driving component to move therein. Due to such configuration, the driving component can be driven to slide toward the interior of the hollow guiding portion to drive the locking component to depart from the locking position after the driving component receives the releasing force, and the sliding movement of the driving component is guided by the hollow guiding portion, which facilitates the transmission of the releasing force. Specifically, please refer to FIG. 1, FIG. 2 and FIG. 5A, the hollow guiding portion 211 can be disposed on the child carrier mount 21 for allowing the child carrier 3 to be mounted thereon. When the child carrier 3 is disposed on the stroller frame 2, the hollow guiding portion 211 is located beneath the child carrier 3, and the driving component 41 is partially and slidably inserted into the hollow guiding portion 211. An end of the driving component 41 is exposed out of the hollow guiding portion 211 for contacting with the child carrier 3 or the interacting component thereon.

Furthermore, the driving component can contact with the locking component directly or indirectly for the transmission of the releasing force. If the driving component contacts with the locking component directly, the driving component can provide the releasing force to the locking component by pushing, pulling or providing an avoiding space to the locking component. For example, the driving component can be pivoted to the stroller frame. An end of the driving component can abut against the locking component. The locking component is biased to depart from the locking position, but stay in the locking position because of the abutment of the driving component. When the child carrier or the interacting component drives the driving component to pivot during the pivotal movement of the child carrier, the driving component can be driven to be detached from the locking component and provide an avoiding space for the locking component, so that the driving component can be driven to depart from the locking position to allow the folding action of the stroller frame.

On the other hand, if the driving component provides the releasing force to the locking component indirectly, the stroller frame can further include a linking element disposed between the driving component and the locking component for receiving the releasing force provided by the driving component and for transmitting the releasing force to the locking component to drive the locking component to depart from the locking position. Specifically, the linking element can be fixed on the locking component to drive the locking component to move. Alternatively, in another embodiment, the linking element can be pivoted to the locking component, so as to drive the locking component to move in a direction different from a moving direction of the linking element, to depart from the locking position when the linking element receives the releasing force. However, it is not limited thereto. Any structure which can be disposed between the locking component and the driving component, and is able to receive a release force from the driving component and transfer it to the locking component for releasing the stroller frame, can be included within the scope of the invention.

Figure 6A:
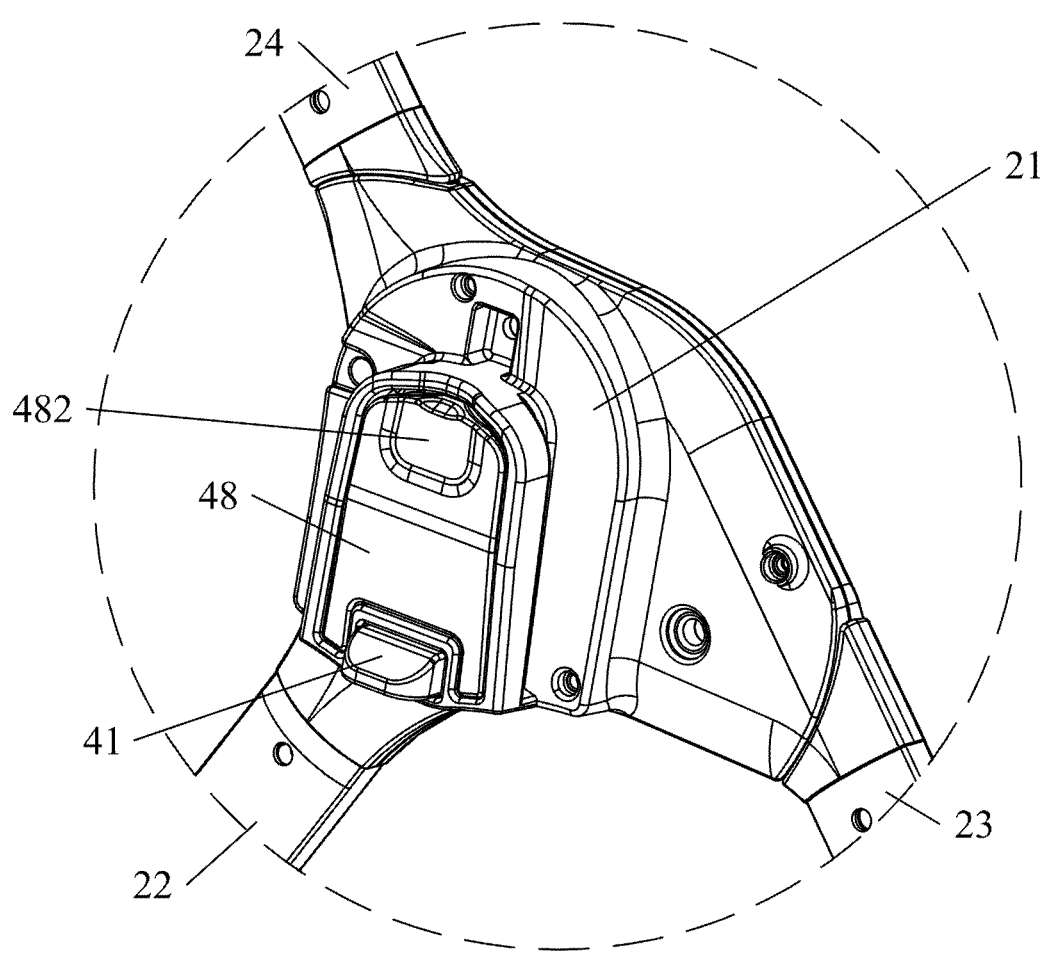
FIG. 6A to FIG. 6C are partial enlarged diagrams of a baby stroller according to a second embodiment of the present invention.
Figure 6B:
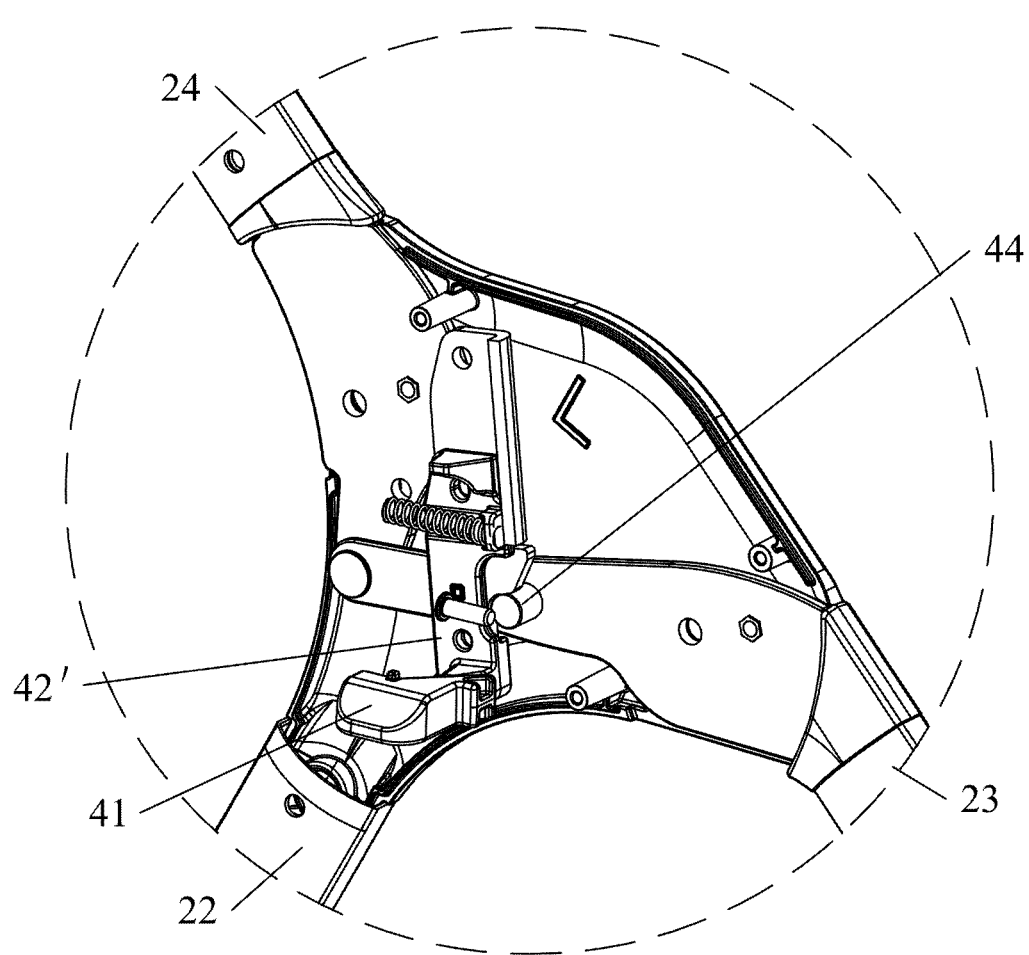
Figure 6C:
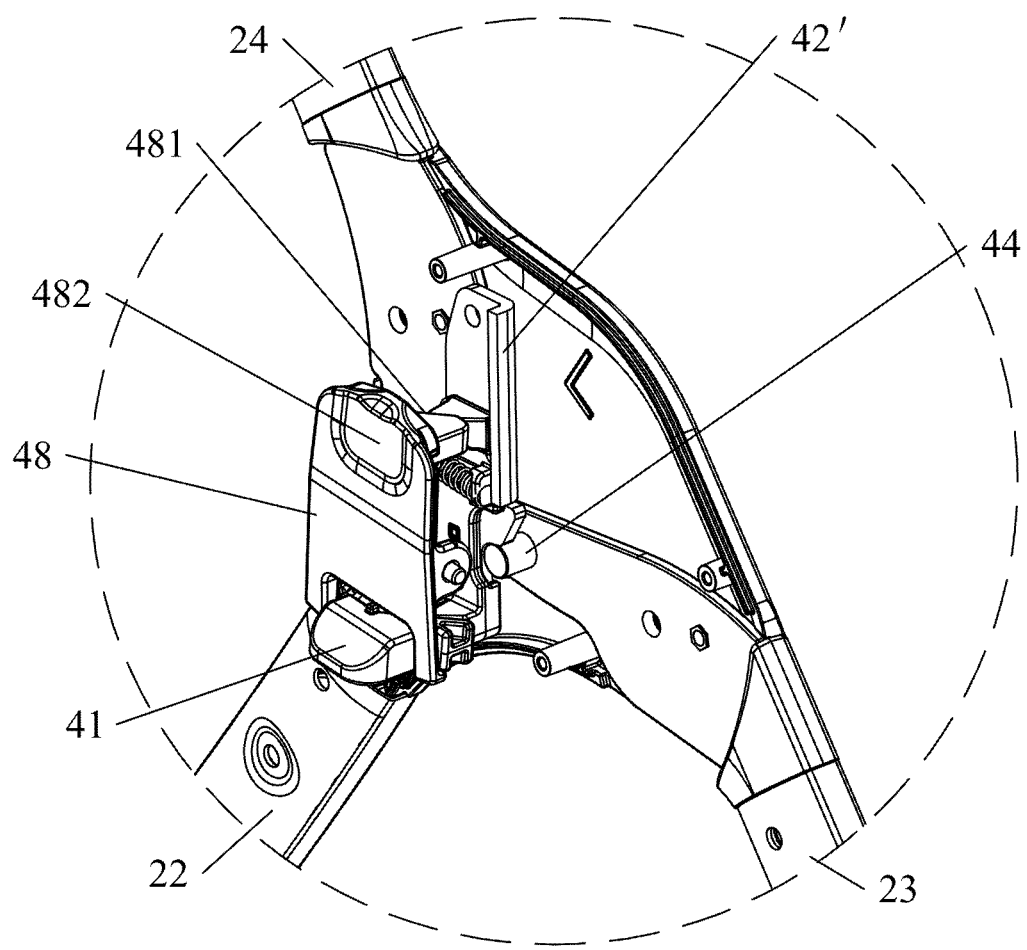
Figure 7A:
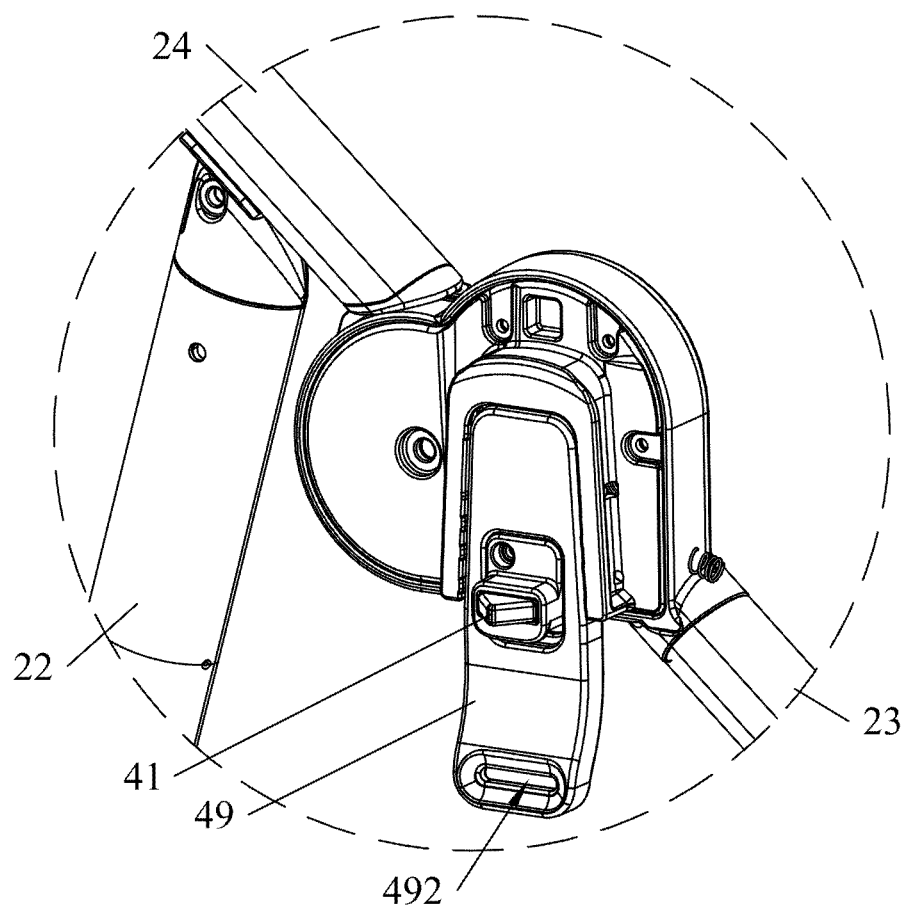
FIG. 7A to FIG. 7D are partial enlarged diagrams of the stroller according to a third embodiment of the present invention.
Figure 7B:
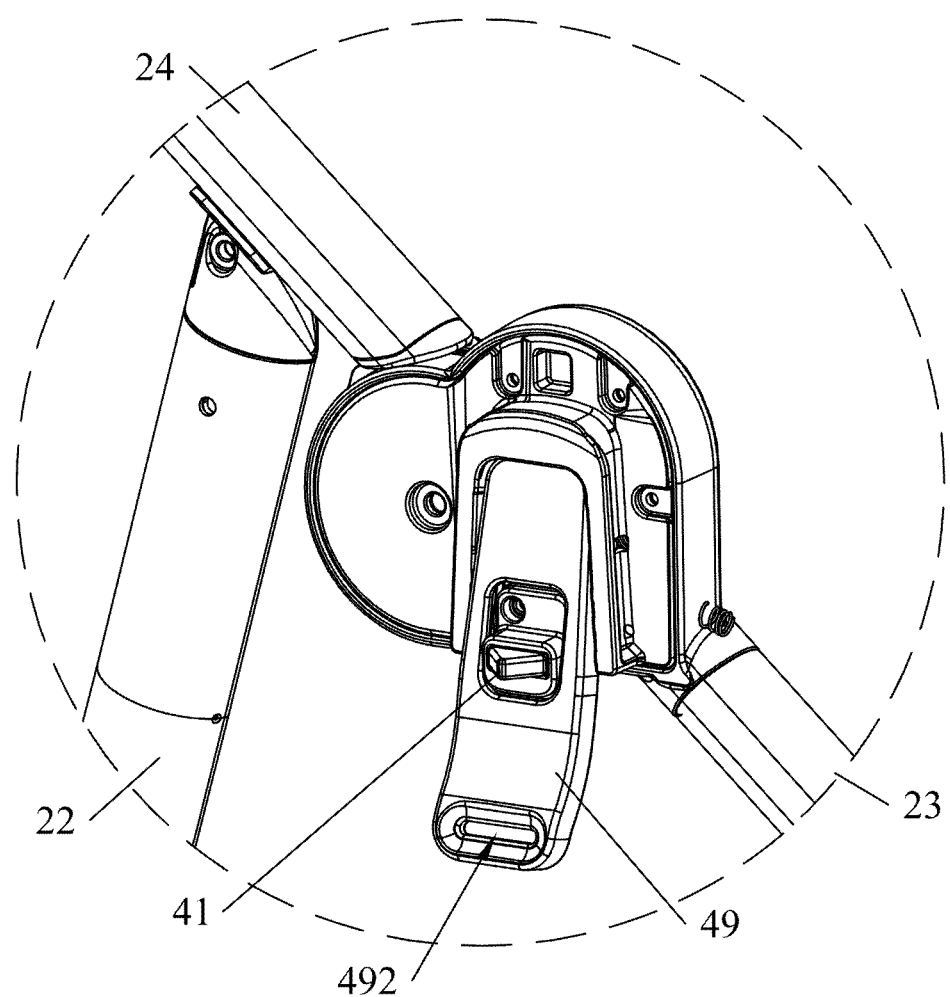
Figure 7C:
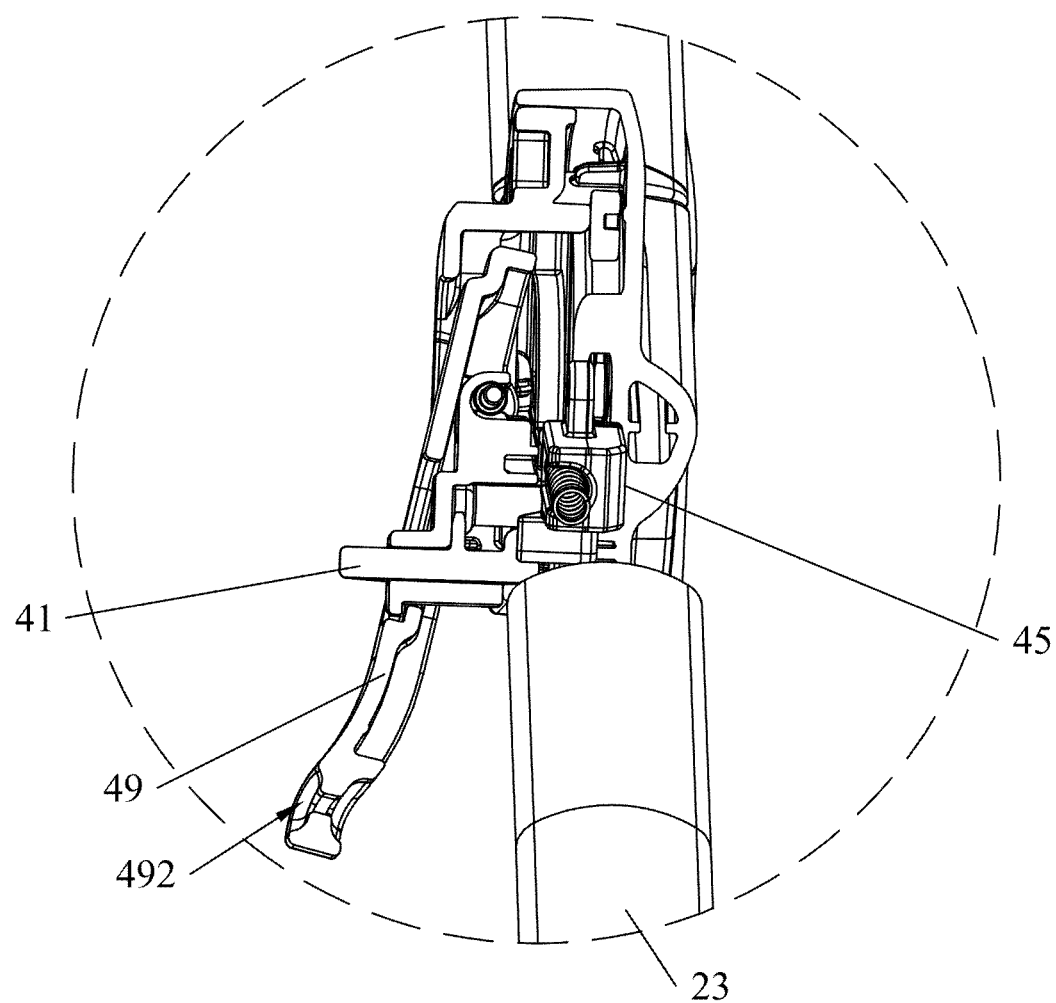
Figure 7D:
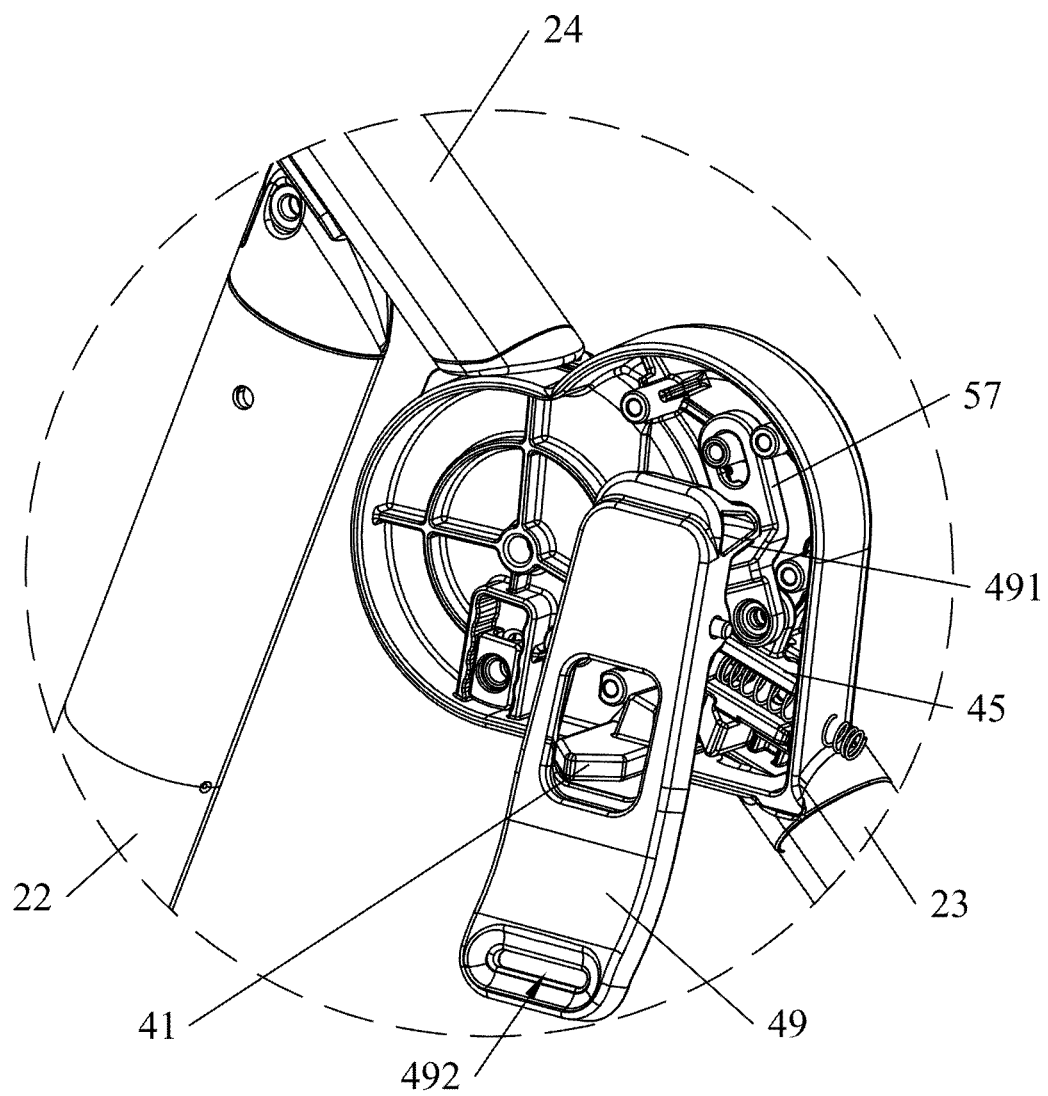
Figure 8A:
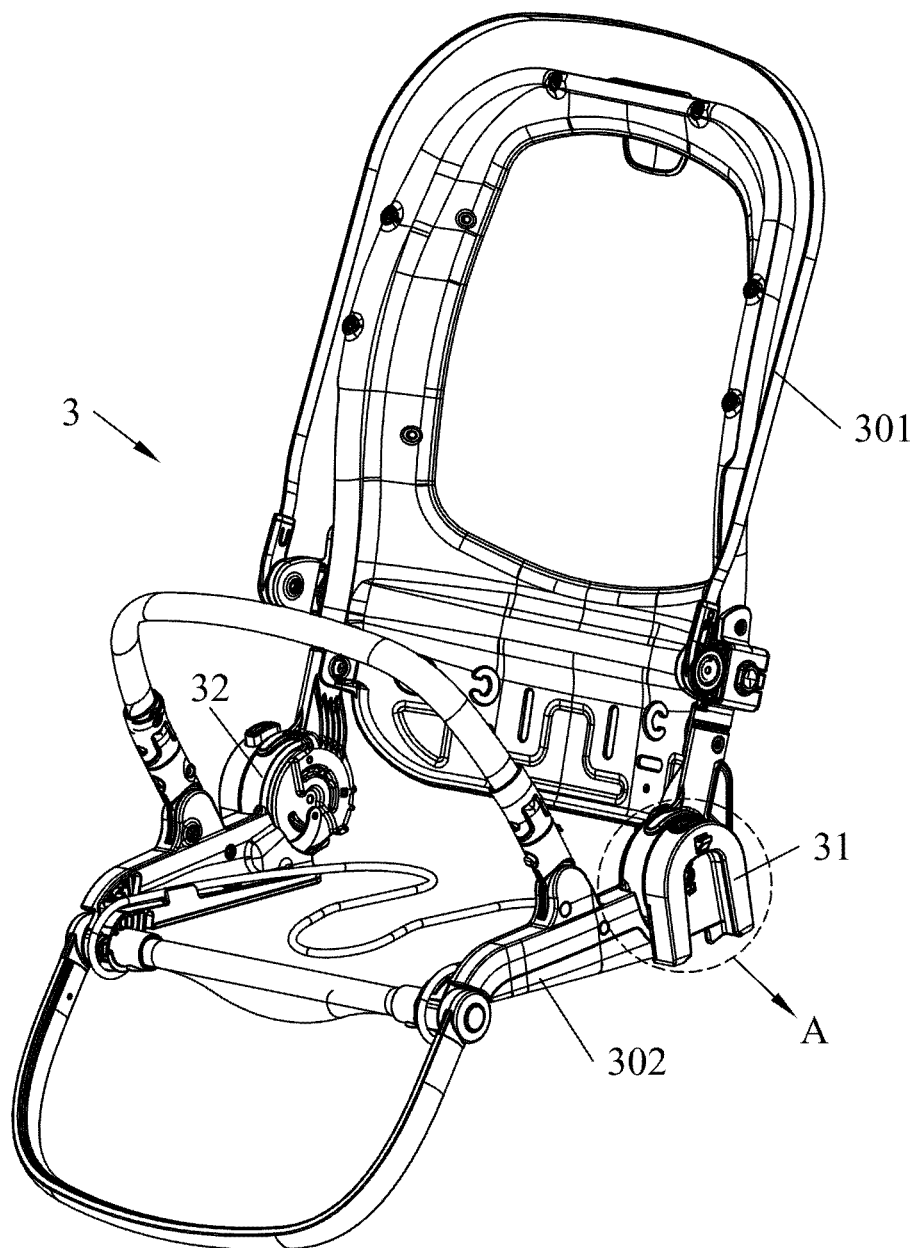
FIG. 8A to FIG. 8F are diagrams of a positioning mechanism according to a fourth embodiment of the present invention.
Figure 8B:
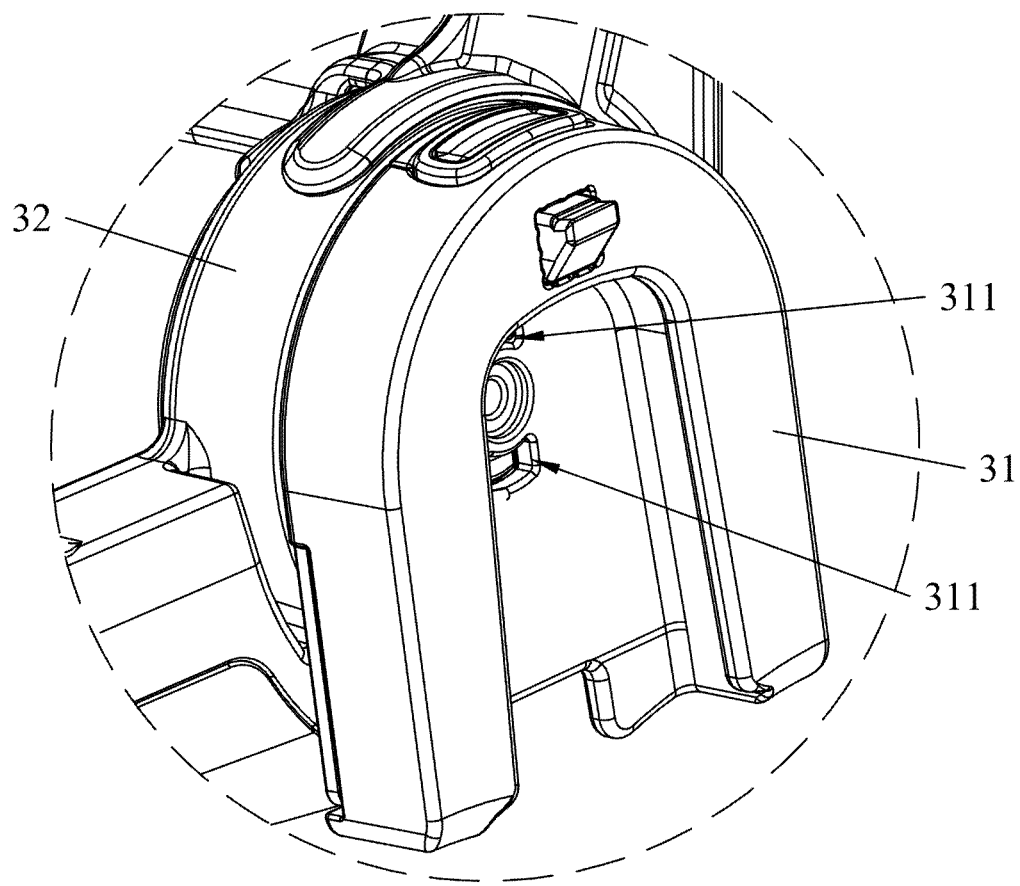
Figure 8C:
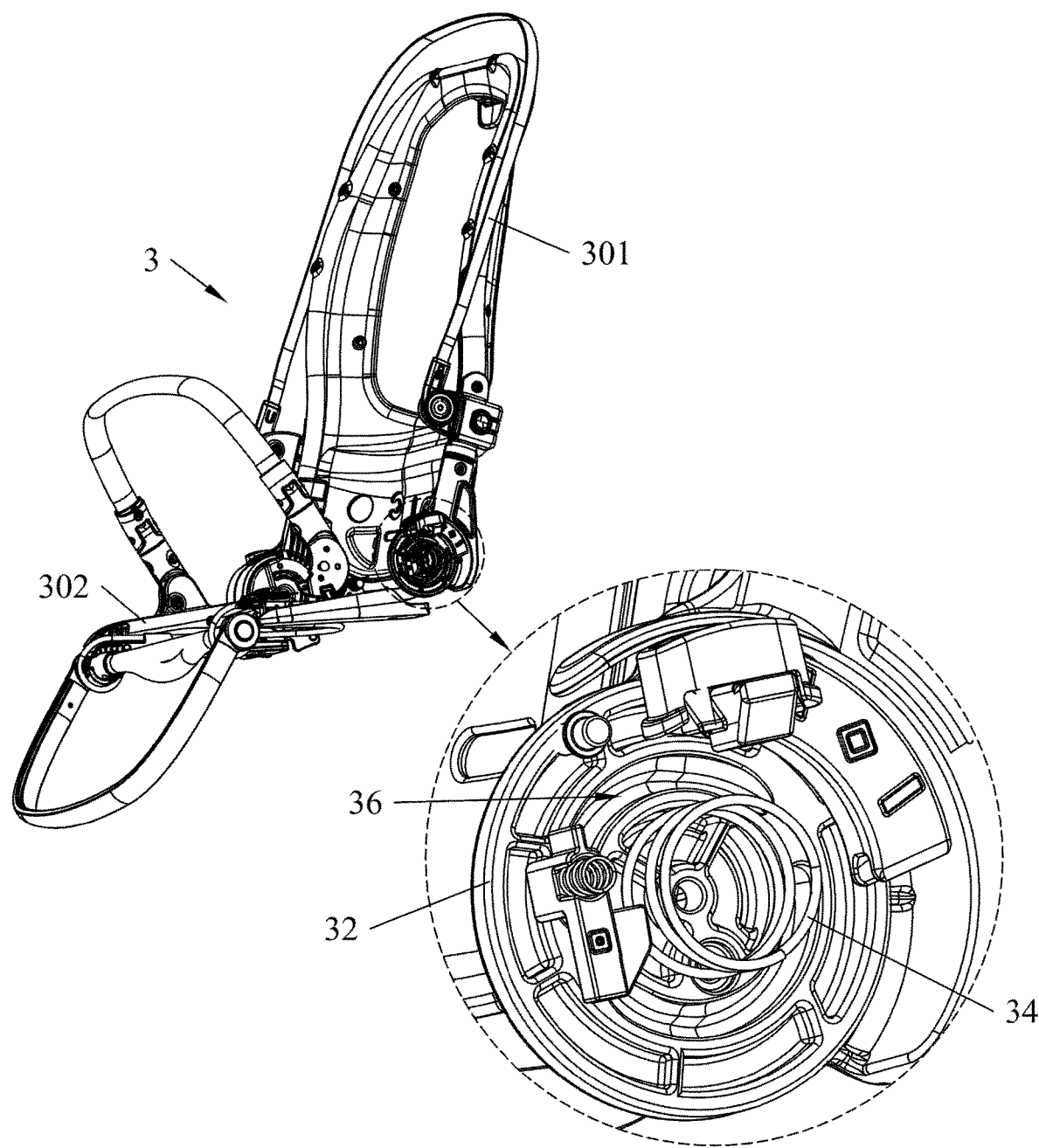
Figure 8D:
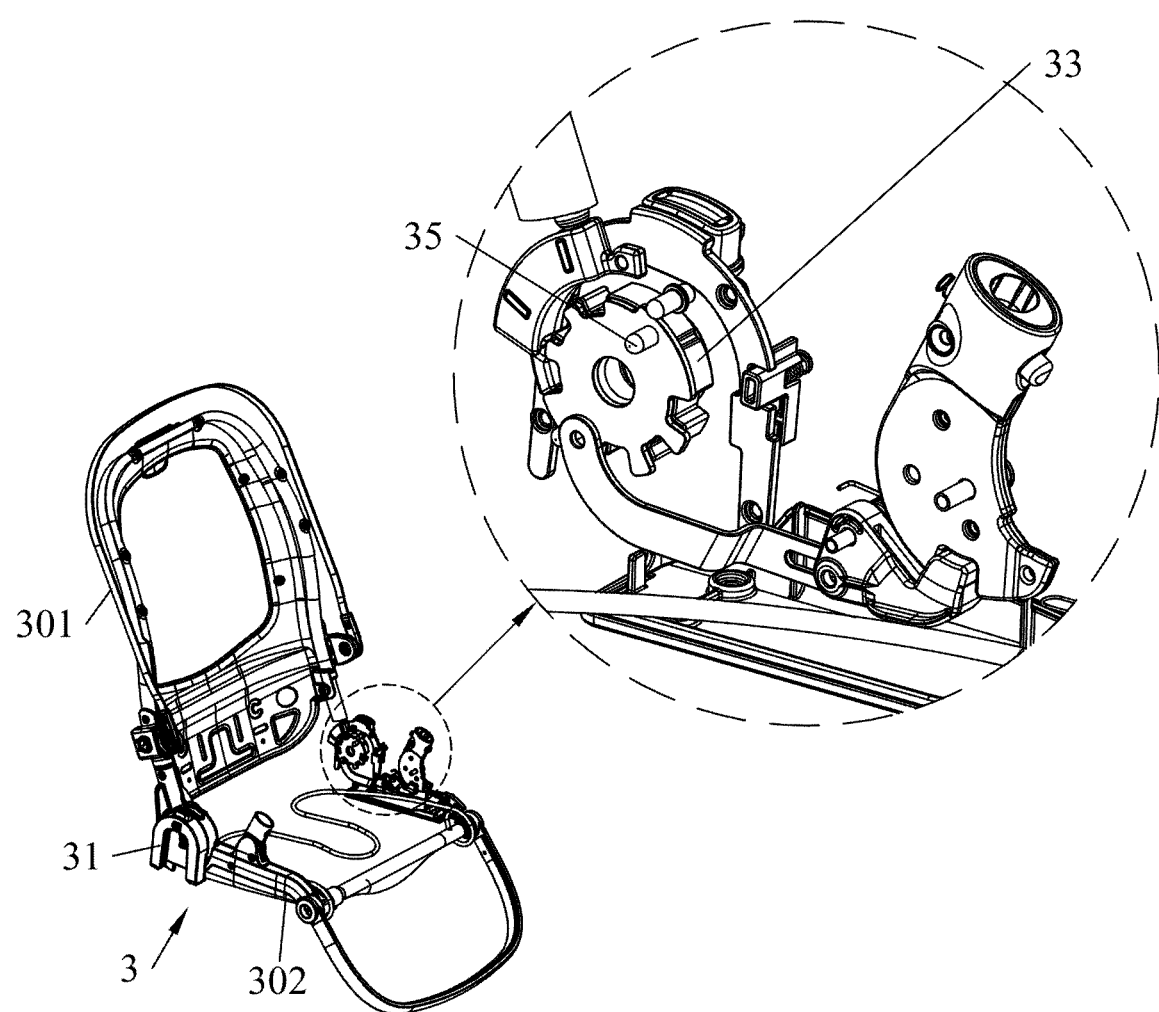
Figure 8E:
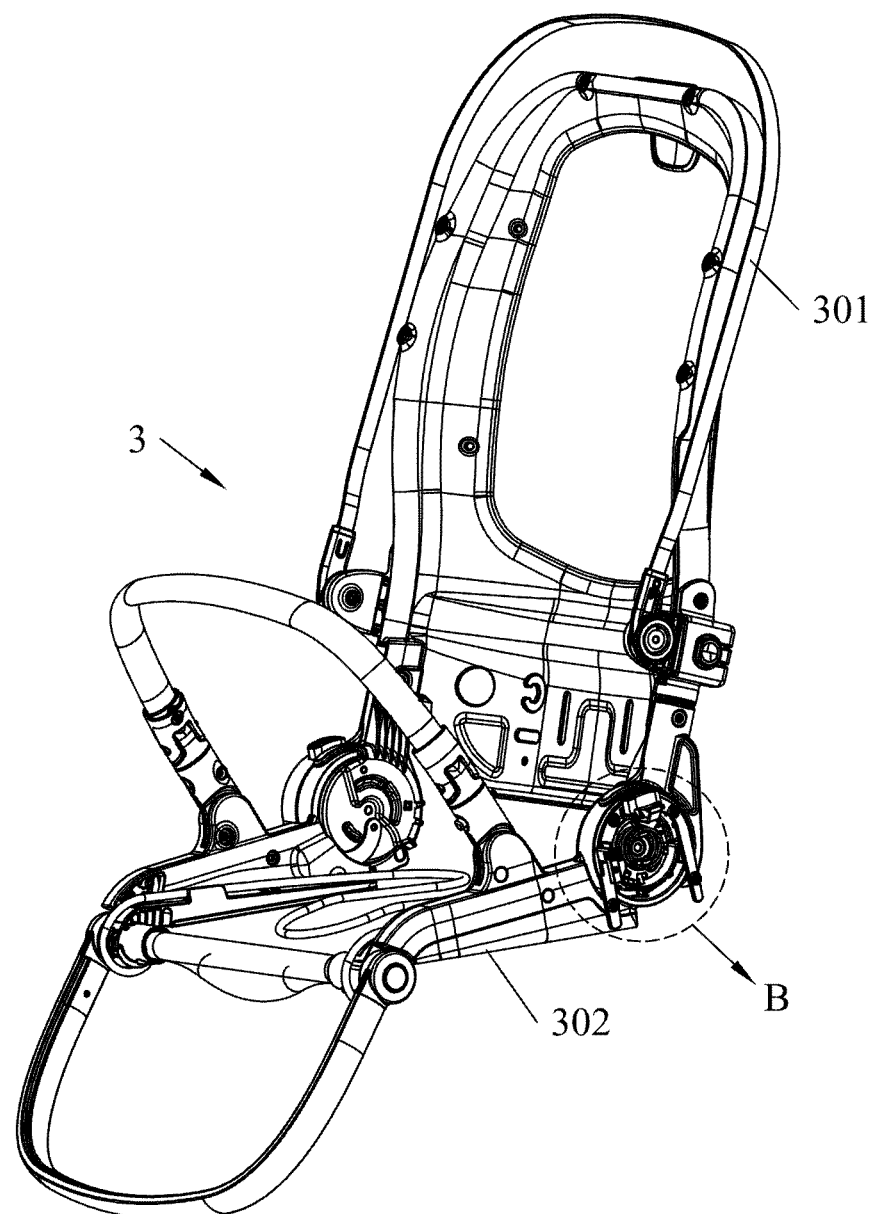
Figure 8F:
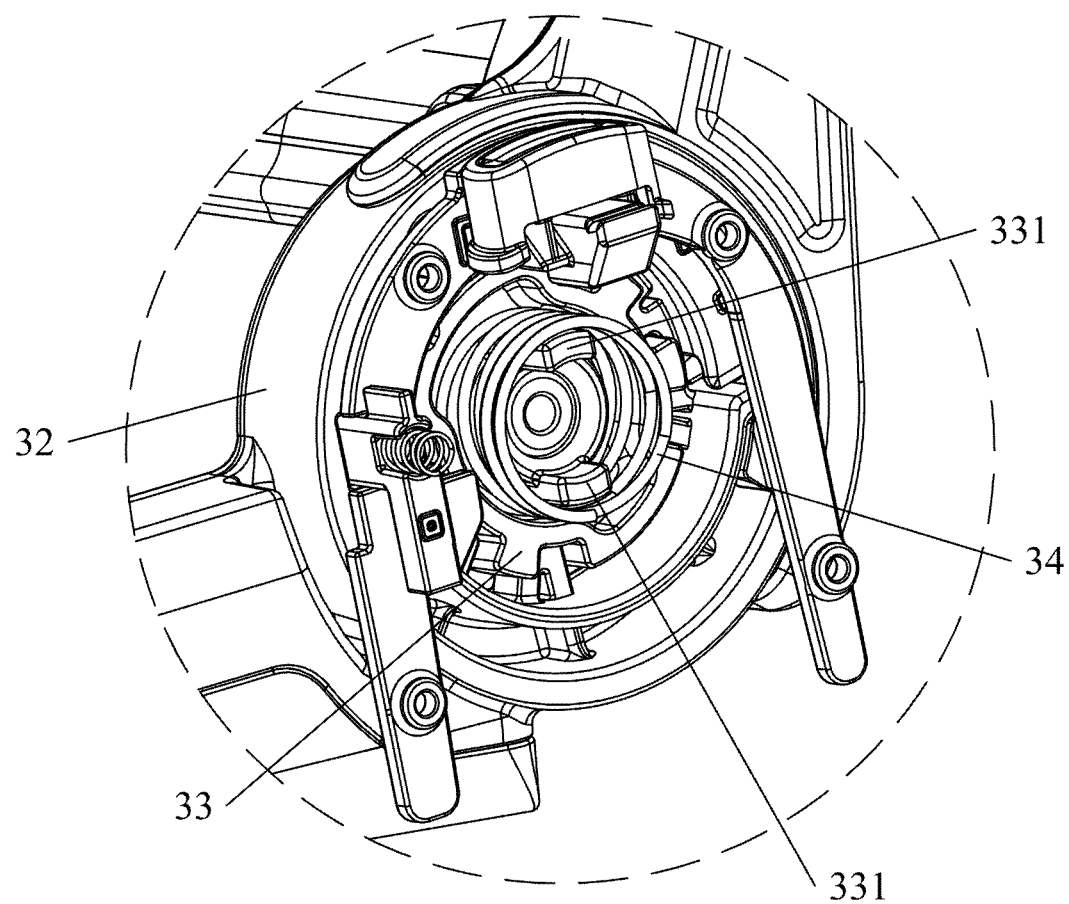

In an embodiment, the releasing portion can further include a releasing component to provide an option for providing the releasing force to the locking component, or drive the locking component to move cooperatively with the driving component. Similar to the driving component, the releasing component can be disposed on the child carrier mount and corresponding to the locking component for receiving the releasing force to drive the locking component to depart form the locking position, so as to allow the folding action of the stroller frame. Furthermore, the releasing component can be disposed on the child carrier mount pivotally, slidably, or engageably. The releasing component can contact with the locking component by pushing, pulling or providing an avoiding space to the locking component, and a contact point of the releasing component and the locking component and a contact point of the driving component and the locking component can be the same or not. Operational of the releasing component is similar to the one of the driving component. Detailed description is omitted herein for simplicity. Also, the releasing component can be a pressing component, a rotating component, a lever switch, or a rocker type switch. However, it is not limited thereto. Specifically, please refer to FIG. 6A to FIG. 6C. FIG. 6A to FIG. 6C are partial enlarged diagrams of a baby stroller according to a second embodiment of the present invention. As shown in FIG. 6A to FIG. 6C, in this embodiment, the releasing component 48 is a pressing component pivotally disposed on the child carrier mount 21. The releasing component 48 includes a pushing inclined surface 481 contacting with the locking component 42'. The contact point of the releasing component 48 and the locking component 42' and the contact point of the driving component 41 and the locking component 42' can be located at different locations. When an outer surface 482 of the releasing component 48 is pushed by the pivotal movement of the child carrier 3, the releasing component 48 is moved toward the locking component 42' to drive the locking component 41 to depart from the locking position to detach from an engaging component 44, so as to allow the folding action of the stroller frame 2.

Besides, if the releasing component is provided as an option for providing the releasing force to the locking component, the baby stroller can further include an operating component, and the operating component can be disposed on the stroller frame or the child carrier in a direct manner, or disposed on the stroller frame and passing through the child carrier after the child carrier is mounted on the stroller frame for easy operation. The releasing component includes a fixing end for connecting to the operating component. No matter whether the child carrier is mounted on the stroller frame, the user can drive the releasing component to move by pulling the strap due to this configuration, so as to allow the folding action of the stroller frame, which provides multiples ways for the user to fold the stroller frame. Please refer to FIG. 7A to FIG. 7D. FIG. 7A to FIG. 7D are partial enlarged diagrams of the stroller according to a third embodiment of the present invention. As shown in FIG. 7A to FIG. 7D, in this embodiment, the releasing component 49 is pivotally disposed on the stroller frame 2 and includes a pushing inclined surface 491 which contacts with the locking component 45. Specifically, as shown in FIG. 7A to FIG. 7D, a pivoting axis of the releasing component 49 is perpendicular to a pivoting axis of the locking component 45. Furthermore, the operating component is a strap, which is disposed on the stroller frame 2 and not shown in figures. An opening 492 can be formed on an end of the releasing component 49 for allowing the strap to be fixed thereon. When the strap is pulled upwardly by the user, the strap can drive the releasing component 49 to pivot toward the locking component 45, so as to drive the locking component 45 by the pushing inclined surface 491 to depart from the locking position for allowing the folding action of the stroller frame 2. However, the present invention is not limited to this embodiment. The operating component also can drive the releasing component to pivot by any other mechanism, so as to drive the locking component to depart from the locking position to allow the folding action of the stroller frame.

Furthermore, in order to make the appearance and the configuration of the stroller frame more concise by reducing elements exposed out of the stroller frame and allow the stroller frame to be folded during adjustment of the using angle or the using state of the child carrier, in an embodiment, the releasing component can further cooperate with the positioning mechanism of the child carrier. The positioning mechanism includes an abutting component which is disposed within the interior of the positioning mechanism and is driven to move during adjustment movement of the positioning mechanism. The releasing component is installed on the child carrier mount and located corresponding to the abutting component. When the abutting component is moved during the adjustment movement of the positioning mechanism, the abutting component can drive the releasing component to move for allowing the folding action of the stroller frame. Detailed description of an embodiment is provided as follows.

Similar to the aforementioned embodiments, the child carrier can be fixed on the stroller frame directly, or detachably disposed on the stroller frame by coupling the base of the child carrier to the child carrier mount. However, no matter how the child carrier is combined with the stroller frame, the positioning mechanism of the child carrier is located a position corresponding to the releasing portion and the locking component after combination of the child carrier and the stroller frame. Furthermore, a pivoting axis of the positioning mechanism relative to the stroller frame passes through the locking portion and the releasing portion, so that the locking portion, the releasing portion and the positioning mechanism are located on the same pivoting axis.

Furthermore, the structures and the operational principles of the locking portion and the releasing portion of this embodiment can be similar to the aforementioned ones. For example, the releasing portion also can selectively include the releasing component, the driving component or both of them for releasing the locking component. Detailed description is omitted herein for simplicity.

Besides, the positioning mechanism can be used for adjusting and positioning the using angle of the child carrier and further for facilitating the position of the child carrier relative to the stroller frame, if necessary. In other words, the positioning mechanism can allow one portion of the child carrier, e.g., the backrest portion, to pivot relative to another portion of the child carrier, e.g., the seat portion or allow the whole child carrier to pivot relative to the stroller frame for adjusting an angle of the child carrier relative to the stroller frame. The structure and the operational principle of the positioning mechanism of this embodiment are similar to the aforementioned ones. Detailed description is omitted herein for simplicity. Moreover, the positioning mechanism can further include a pivoting mechanism disposed on a side of the base. A pivoting axis of the pivoting mechanism passes through the base and the locking portion. The child carrier can pivot relative to the stroller frame by the pivoting mechanism for allowing the folding action of the stroller frame. Furthermore, detailed description of adjustment of the using angle or the using state of the child carrier by the pivoting mechanism is omitted herein for simplicity. Any pivoting mechanism, including such as a driving mechanism, a triggering mechanism, a linkage mechanism, a gear mechanism, a groove structure, an elastic mechanism or a combination thereof, which can achieve a function of locking, pivoting and positioning the child carrier relative to the stroller frame, can be included within the scope of the present invention.

It should be noticed that in an embodiment of the present invention, the positioning mechanism can include an abutting component which is disposed within the interior of the positioning mechanism and is driven to move during adjustment movement of the positioning mechanism. Furthermore, at least one through hole can be formed on the base of the child carrier and corresponding to the abutting component. The abutting component is located within the interior of the positioning mechanism and does not interfere with the releasing portion of the stroller frame when the child carrier is positioned in the using state. When the child carrier is switched from the using state to a folding state, the abutting component can be moved to extend through the through hole toward the locking portion for pushing the locking portion to drive the locking component to depart from the locking position, which allows the folding action of the stroller frame. However, the abutting component can be driven to move by any structure, and it depends on practical design demands.

Specifically, please refer to FIG. 8A to FIG. 8F. FIG. 8A to FIG. 8F are diagrams of a positioning mechanism 32 according to a fourth embodiment of the present invention. As shown in FIG. 8A to FIG. 8F, in this embodiment, two through holes 311 are formed on the base 31 of the child carrier 3 for allowing the abutting component 33 to extend therethrough when the abutting component 33 is moved by movement of the pivoting mechanism, i.e., the positioning mechanism 32. When the child carrier 3 is located in the using state, the abutting component 33 is driven by a resilient component 34 to be located within the interior of the positioning mechanism 32 and does not interfere with the releasing portion of the stroller frame. Furthermore, the positioning mechanism 32 further includes a pin portion 35 and a driving slot 36. The pin portion 35 abuts against the driving slot 36, and an end of the pin portion 35 abuts against the abutting component 33. The driving slot 36 is a groove slot, and a depth of the groove slot is from deep to shallow. Therefore, when the backrest portion 301 is pivoted toward the seat portion 302, the driving slot 36 drives the pin portion 35 to move outwardly to drive the abutting component 33 to overcome a resilient force of the resilient component 34 to achieve a purpose of moving the abutting component 33 by the movement of the pivoting mechanism, i.e., the positioning mechanism 32, and a purpose of providing the releasing force to the releasing portion by the abutting component passing through the through hole 31, which achieves a function of allowing the folding action of the stroller frame during the pivotal movement of the child carrier 3. However, the above embodiment is obviously only one of the many ways to drive the abutting component 33 by the positioning mechanism 32. Any positioning mechanism, including such as a driving mechanism, a triggering mechanism, a linkage mechanism, a gear mechanism, a groove structure, an elastic mechanism or a combination thereof, which can achieve a function of driving the abutting component provides the releasing force to the releasing portion, can be included within the scope of the present invention.

In summary, the present invention provides the baby stroller which has the folding mechanism triggered by the child carrier and allows the folding action of the stroller frame by the pivotal movement of the child carrier relative to the stroller frame. Therefore, when it is desired to fold the baby stroller, it only has to operate the child carrier, and detachment of the child carrier from the stroller frame is not necessary. Furthermore, the baby stroller utilizes the driving component to solve the problem of difficult access to the locking component disposed within the interior of the stroller frame. Moreover, the baby stroller utilizes the releasing component to provide the option for the user to release the locking component or release the locking component together with the driving component for strengthening the releasing force acted on the locking component. Besides, the present invention also provides a method of utilizing the positioning mechanism to push the releasing component for allowing the folding action of the stroller frame, so that the stroller frame can be folded during adjustment of the using angle of the child carrier. Thus, in contrast to the prior art, the present invention utilizes the seat to push the driving component for allowing the folding action of the stroller frame during the pivotal movement of the child carrier relative to the stroller frame. Therefore, the stroller frame is allowed to be folded when the seat is pivotally folded, and there is no need of independent operations of the stroller frame and the seat while folding the baby stroller, which provides a convenient way for a user to fold the baby stroller frame and the seat together.

In order to illustrate technical specifications and structural features as well as achieved purposes and effects of the present invention, relevant embodiments and figures are described as follows.

As shown in FIG. 1, the baby stroller 1 includes a stroller frame 2, a seat 3, as an example of the child carrier, pivoted to the stroller frame 2, and two example folding mechanisms 4. As shown in FIG. 1, it is an example status of use that the seat 3 is pivoted relative to the stroller frame 2, and the stroller frame 2 is locked in an unfolded state by the two folding mechanisms 4. Each folding mechanism 4 includes an example driving component 41 movably disposed on the stroller frame 2. During pivotal movement of the seat 3, the two driving components 41 are pushed by the seat 3 to unlock the stroller frame 2 for allowing a folding action of the stroller frame 2.

As shown in FIG. 1 and FIG. 2, the baby stroller 1 includes two seat mounts 21 disposed on two opposite inner sides of the stroller frame 2. Each seat mount 21 includes a hollow guiding portion 211 in the lower end, and the hollow guiding portion 211 is protruding in a direction perpendicular to the surface of the stroller frame 2. Each driving component 41 is partially and slidably inserted into the corresponding hollow guiding portion 211, and an end of each driving component 41 is exposed out of the corresponding hollow guiding portion 211. The seat 3 is mounted onto the two seat mounts 21. The two driving components 41 are located beneath the seat 3. In one embodiment of the present invention, the baby stroller 1 can further include a positioning mechanism for restraining and allowing the pivotal movement of the seat 3 relative to the stroller frame 2. Detailed description of the positioning mechanism is omitted herein for simplicity.

At least one driven slanted surface 411 is formed on the end of each driving component 41 exposed out of the corresponding hollow guiding portion 211. The seat 3 pushes the two driving components 41 to slide toward the interiors of the two hollow guiding portions 211 by contacting with the two driven slanted surfaces 411 during the pivotal movement of the seat 3. Preferably, there are two driven slanted surfaces 411 respectively formed on a front side and a rear side of the end of each driving component 41 exposed out of the corresponding hollow guiding portion 211. Therefore, the seat 3 can push the two driving components 41 to slide toward the interiors of the two hollow guiding portions 211 by cooperation of a seat base 31 of the seat 3 and the two front driven slanted surfaces 411 during the forward pivotal movement of the seat 3, and the seat 3 also can push the two driving components 41 to slide toward the interiors of the two hollow guiding portions 211 by cooperation of a lateral portion 32 of the seat 3 and the two rear driven slanted surfaces 411 during the rearward pivotal movement of the seat 3. In other words, each driving component 41 is allowed to be pushed to slide toward the interior of the corresponding hollow guiding portion 211 for allowing the folding action of the stroller frame 2 by such configuration of the two driven slanted surfaces 411 no matter whether the seat 3 is pivoted forwardly or rearwardly. However, it is not limited to this embodiment. In another embodiment, there can be only one driven slanted surface formed on each driving component, which only allows each driving component to be pushed to slide by either the forward pivoting seat or the rearward pivoting seat.

Figure 5B:
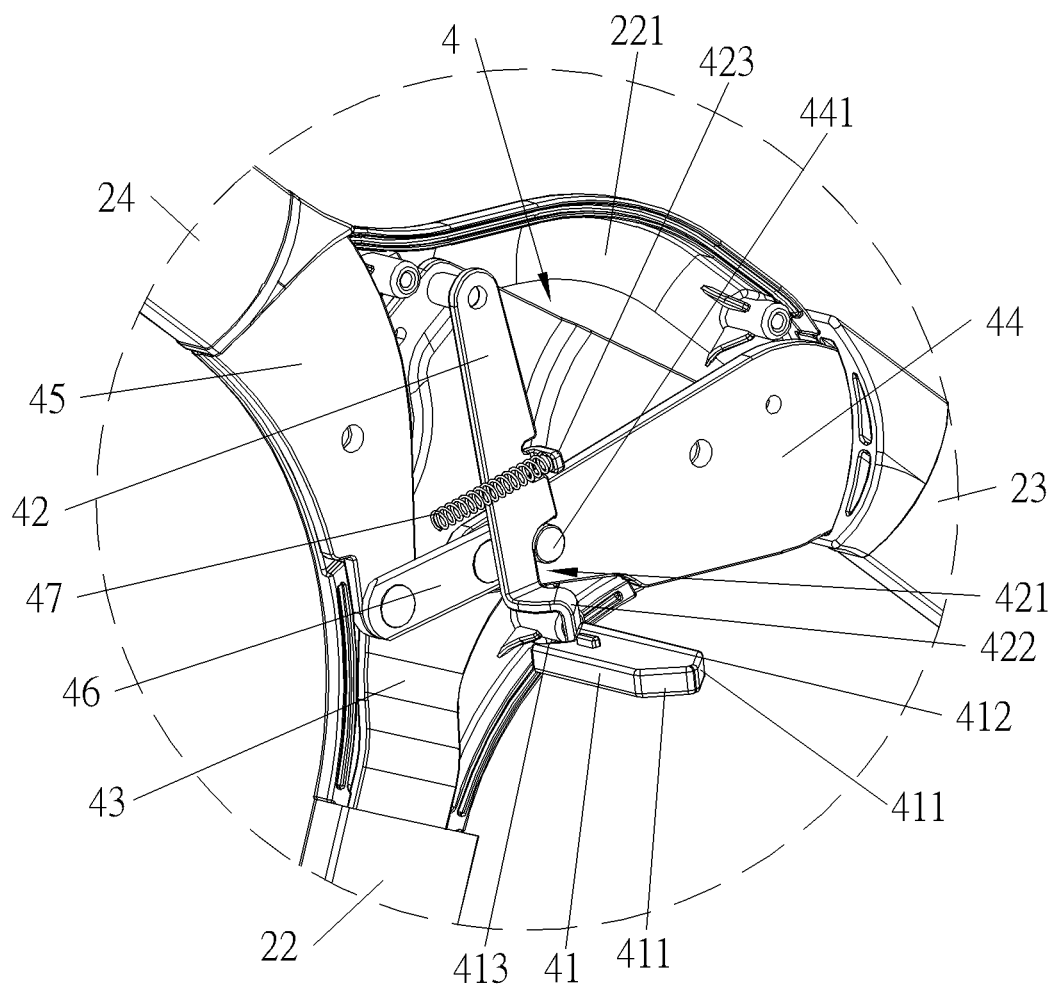
Figure 5C:
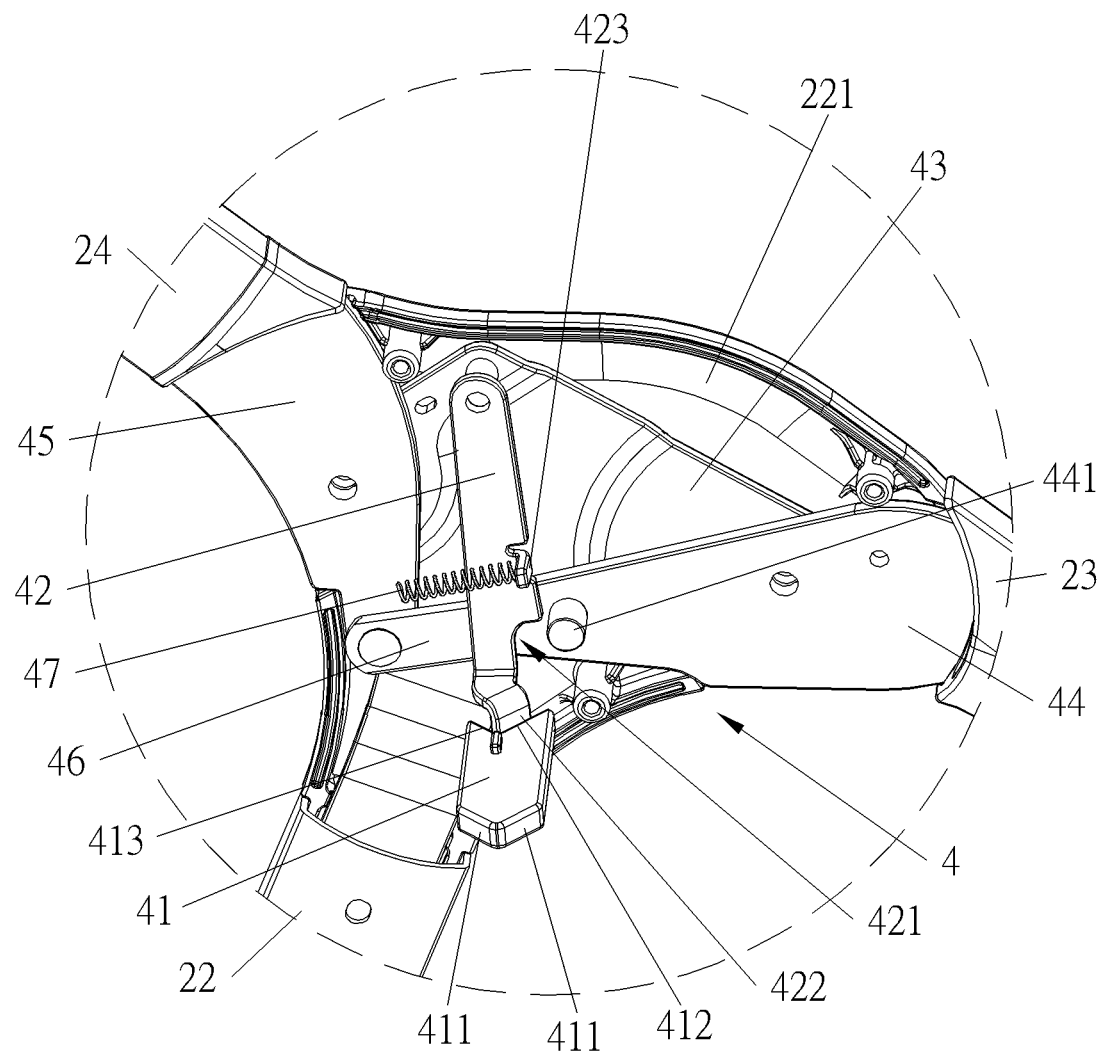

Please refer to FIG. 2 and FIG. 5A to FIG. 5C. FIG. 5A to FIG. 5C are partial enlarged diagrams of the baby stroller 1 according to the first embodiment of the present invention. As shown in FIG. 2 and FIG. 5A, the frame 2 includes a rear support 22, a front support 23 and a handle support 24. Each of the rear support 22, the front support 23 and the handle support 24 is substantially formed in a U shape. Each of two upper ends of the rear support 22 includes a pivotal connecting portion 221, which is a flat structure. The front support 23 and the handle support 24 are pivoted to the two pivotal connecting portions 221, so that the front support 23 and the handle support 24 are pivotally foldable relative the rear support 22. The stroller frame 2 further includes two covering components 25. A shape of each covering component 25 substantially matches with a shape of the corresponding pivotal connecting portion 221. Each covering component 25 is fixed onto and covers an inner side of the corresponding pivotal connecting portion 221 for covering components of the corresponding folding mechanism 4 except the driving component 41. Each covering component 25 can be fixed with the corresponding seat mount 21 and the corresponding hollow guiding portion 211 to form a one-piece structure. A chamber of each hollow guiding portion 211 penetrates through the corresponding covering component 25. Each folding mechanism 4 further includes a locking component 42 for restraining the folding action of the stroller frame 2 in the unfolded state. An end of each driving component 41 passes through the corresponding covering component 25 via the corresponding hollow guiding portion 211 for contacting with the corresponding locking component 42, so that the two locking components can be moved by the two driving components 41 for allowing the folding action of the stroller frame 2.

As shown in FIG. 5B and FIG. 5C, each folding mechanism 4 further includes a first fixing component 43, a second fixing component 44, a third fixing component 45 and a linking component 46. The first fixing component 43, the second fixing component 44, the third fixing component 45, the linking component 46 and the locking component 42 can be flat structures for being received inside the stroller frame 2 easily. Each first fixing component 43 is fixed on the corresponding pivotal connecting portion 221 of the rear support 22. Each second fixing component 44 is fixed on a corresponding end of the front support 23. Each third fixing component 45 is fixed on a corresponding end of the handle support 24. Each first fixing component 43 is pivoted to the corresponding second fixing component 44 and the corresponding third fixing component 45. Two ends of each linking component 46 are respectively pivoted to the corresponding second fixing component 44 and the corresponding third fixing component 45. An engaging portion 441 protrudes from each second fixing component 44. A first end of each locking component 42 is pivoted to the corresponding first fixing component 43, and an engaging notch 421 is formed on a second end of each locking component 42 for engaging with the corresponding engaging portion 441. When each engaging notch 421 engages with the corresponding engaging portion 441, the corresponding locking component 42 and the corresponding linking component 46 cooperatively restrain relative movement of the corresponding first fixing component 43, the corresponding second fixing component 44 and the corresponding third fixing component 45.

A driving inclined surface 412 is formed on an end of each driving component 41 adjacent to the corresponding pivotal connecting portion 221. An inclined portion 422 is formed on the second end of each locking component 42 and bent toward the corresponding driving component 41 for cooperating with the corresponding driving inclined surface 412. When each driving component 41 slides toward the interior of the corresponding hollow guiding portion 211 to push the corresponding locking component 42 to swing in a clockwise direction as shown in FIG. 5C by cooperation of the corresponding driving inclined surface 412 and the corresponding inclined portion 422, so that the corresponding engaging notch 421 can be disengaged from the corresponding engaging portion 441 by a swinging movement of the corresponding locking component 42. After each engaging notch 421 is disengaged from the corresponding engaging portion 441, the relative movement of the corresponding first fixing component 43, the corresponding second fixing component 44 and the corresponding third fixing component 45 is not restrained by the corresponding locking component 42 and the corresponding linking component 46. In other words, at this moment, each second fixing component 44 can be freely pivoted relative to the corresponding first fixing component 43, and each third fixing component 45 also can be freely pivoted relative to the corresponding first fixing component 43.

Furthermore, a restraining inclined surface 413 is formed on the end of each driving component 41 adjacent to the corresponding pivotal connecting portion 221. Each restraining inclined surface 413 is connected to the corresponding driving inclined surface 412 to form a V-shaped structure for restraining a sliding distance of the corresponding inclined portion 422 relative to the corresponding driving inclined surface 412. However, it is not limited to this embodiment. In another embodiment, the restraining inclined surface 413 can be omitted. Preferably, each folding mechanism 4 further includes a resilient component 47 abutting against the corresponding locking component 42 to bias the corresponding engaging notch 421 to engage with the corresponding engaging portion 441. Specifically, the resilient component 47 can be a compression spring. An end of the compression spring abuts against an abutting portion 423 of the locking component 42, and another end of the compression spring abuts against the covering component 25 shown in FIG. 2.

In this embodiment, each folding mechanism 4 utilizes the first fixing component 43 disposed on the rear support 22, the second fixing component 44 disposed on the front support 23 and the third fixing component disposed on the handle support 24 to achieve a purpose of allowing or restraining the relative movement of the front leg 22, the rear leg 23 and the handle support 24, i.e., a pivotal movement of the front leg 22 relative to the rear leg 23 and a pivotal movement of the handle support 24 relative to the rear leg 23. However, the present invention is not limited to this embodiment. In another embodiment, each folding mechanism can only include the first fixing component disposed on the rear leg and the second fixing component disposed on one of the front leg and the handle for achieving a purpose of allowing or restraining the pivotal movement of the one of the front support 23 and the handle 23 relative to the rear support 22.

Figure 9:
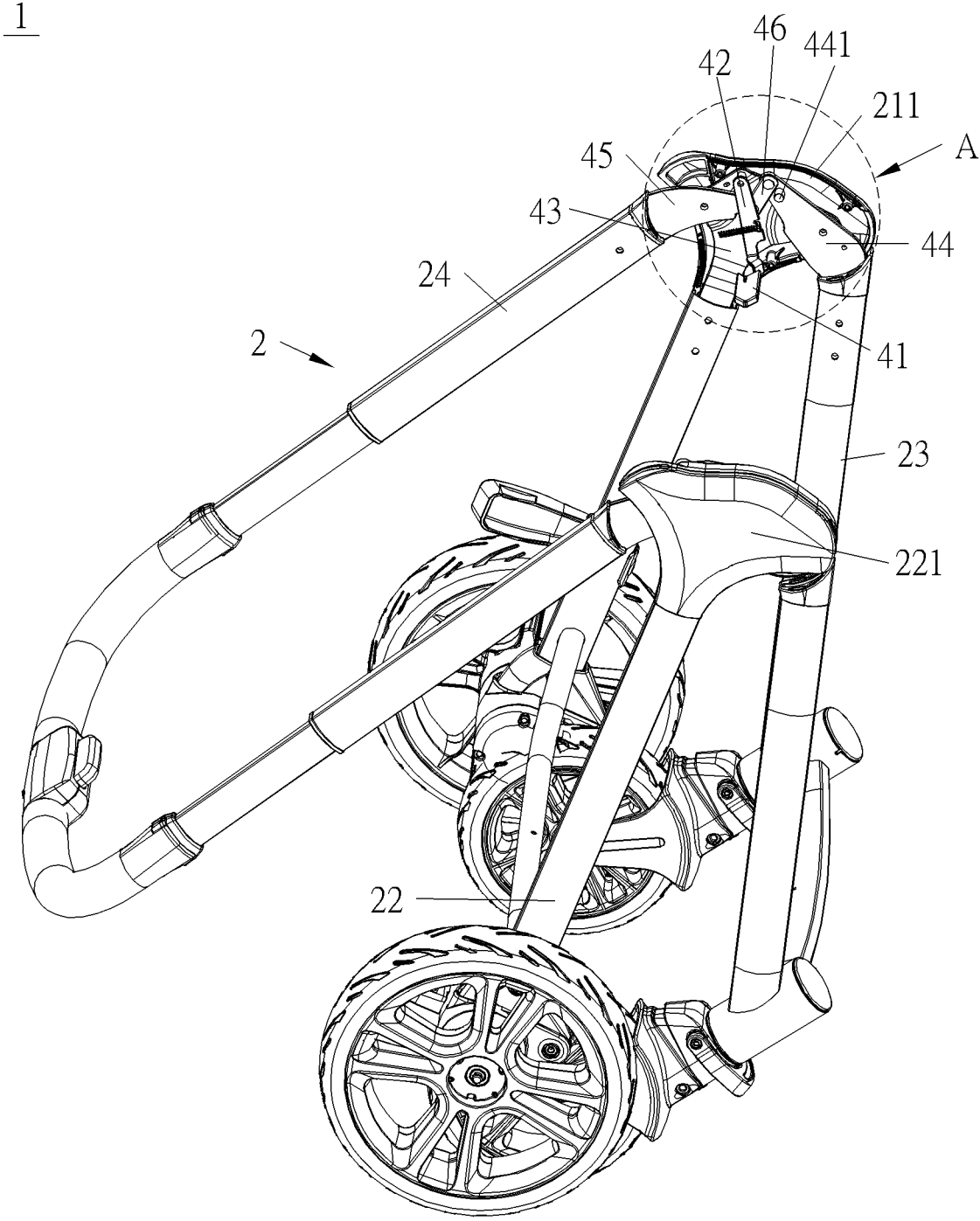
FIG. 9 is a diagram of the baby stroller as a stroller frame is in a folded state according to the first embodiment of the present invention.
Figure 10:
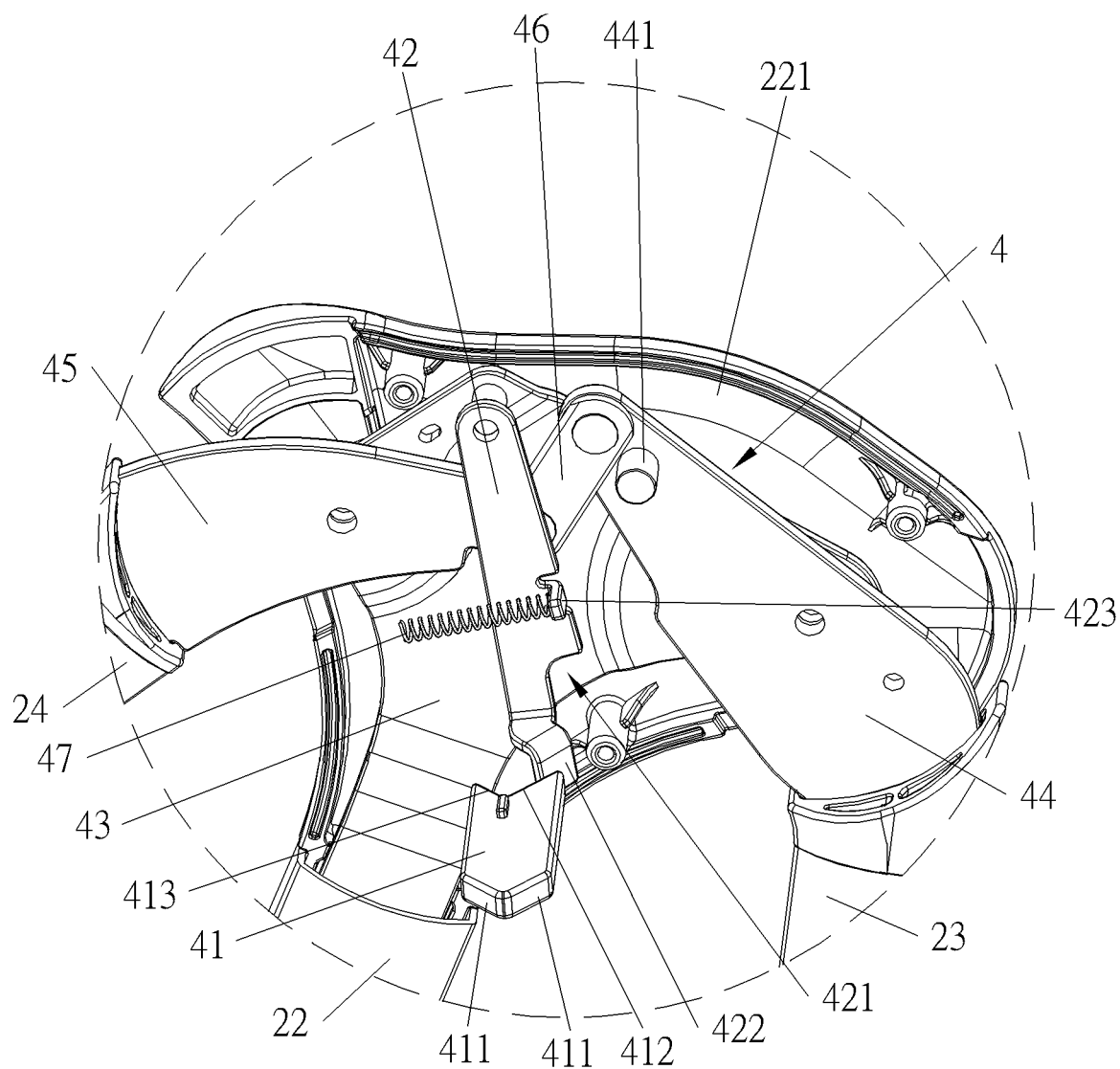
FIG. 10 is an enlarged diagram of an A portion of the baby stroller shown in FIG. 9 according to the first embodiment of the present invention.

Please refer to FIG. 1, FIG. 9 and FIG. 10. FIG. 9 is a diagram of the baby stroller 1 as the stroller frame 2 is in a folded state according to the first embodiment of the present invention. FIG. 10 is an enlarged diagram of an A portion of the baby stroller 1 shown in FIG. 9 according to the first embodiment of the present invention. When it is desired to fold the baby stroller 1, the positioning mechanism can be released to allow the pivotal movement of the seat 3 relative to the stroller frame 2. Afterwards, the pivoting seat 3 can push the two driving components 41 to respectively slide toward the interiors of the two hollow guiding portions 211 by contacting the two driven slanted surfaces 411, so that the two driving components 41 respectively drive the two locking components 42 to swing by cooperation of the two driving inclined surfaces 412 and the two inclined portions 422, so as to disengage the two engaging notches 421 from the two engaging portions 441. During the aforementioned process, the two resilient components 47 are resiliently deformed. When each locking component 142 is disengaged from the corresponding second fixing component 44 to allow the relative movement of the corresponding fixing component 43, the corresponding second fixing component 44 and the corresponding third fixing component 45, the corresponding second fixing component 44 and the corresponding third fixing component 45 can be pivoted relative to the corresponding first fixing component 43, so as to allow the front support 23 and the handle support 24 to be pivotally folded relative to the rear support 22 for achieving a purpose of folding the stroller frame 2.

In this embodiment, it requires the pivoting seat 3 to allow the folding action of the stroller frame 2. In another embodiment, the stroller can further include other components for allowing the folding action of the stroller frame when the seat is detached from the stroller frame. Detailed description is provided as follows.

Figure 11:
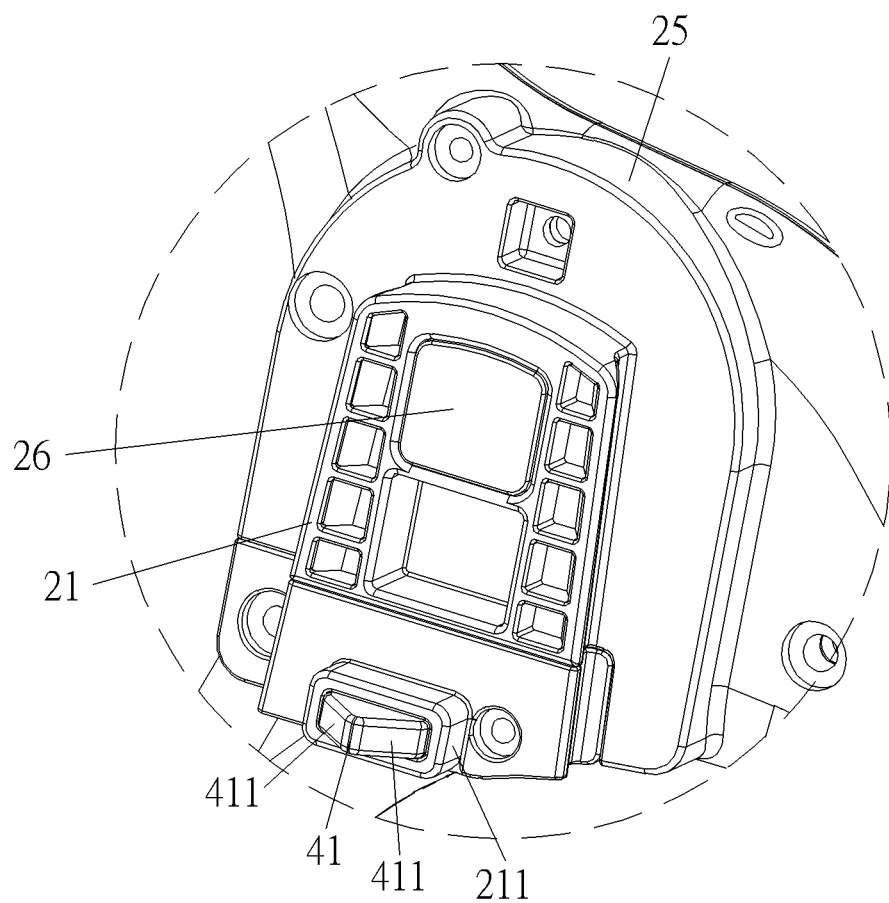
FIG. 11 is a partial enlarged diagram of a baby stroller according to a fifth embodiment of the present invention.
Figure 12:
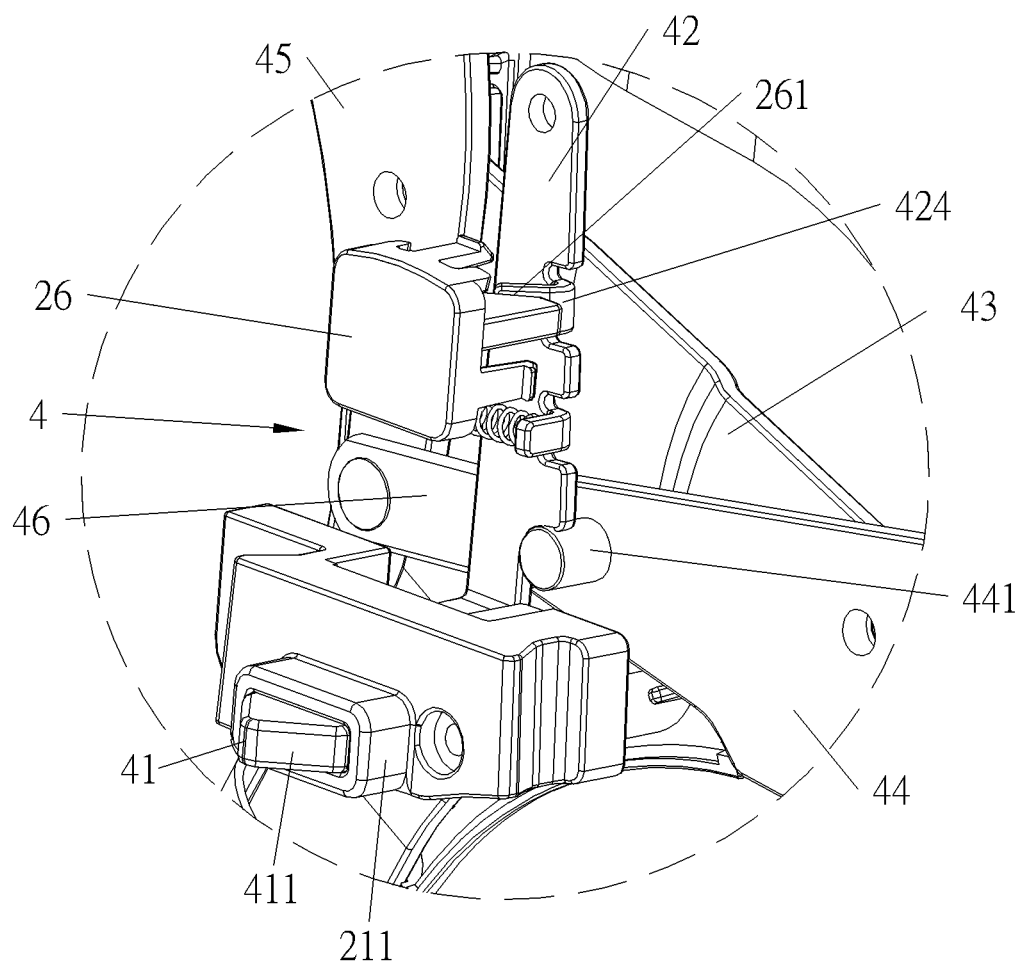
FIG. 12 is a partial diagram of the baby stroller without illustrating a covering component according to the fifth embodiment of the present invention.

Please refer to FIG. 11 and FIG. 12. FIG. 11 is a partial enlarged diagram of the baby stroller 1 according to a fifth embodiment of the present invention. FIG. 12 is a partial diagram of the baby stroller 1 without illustrating the covering component 25 according to the fifth embodiment of the present invention. As shown in FIG. 11 and FIG. 12, in this embodiment, the baby stroller 1 further includes two releasing buttons 26 as an example release component which is slidably disposed on the two seat mount 21 respectively. Each releasing button 26 is located above the corresponding driving component 41. When the seat 3 is detached from the stroller frame 2, the two releasing buttons 26 are accessible for manual operation. A releasing slanted surface 261 is formed on an end of each releasing button 26 inside the corresponding seat mount 21. A releasing contacting portion 424 is disposed on each locking component 42 correspondingly. When each releasing button 26 is pressed to push the corresponding locking component 42 to disengage from the corresponding second fixing component 44 in a swinging manner by cooperation of the corresponding releasing slanted surface 261 and the corresponding releasing contacting portion 424, the front support 23 and the rear leg 24 are allowed to be pivotally folded relative to the rear support 22, so as to achieve the purpose of folding the stroller frame 2.

Figure 13:
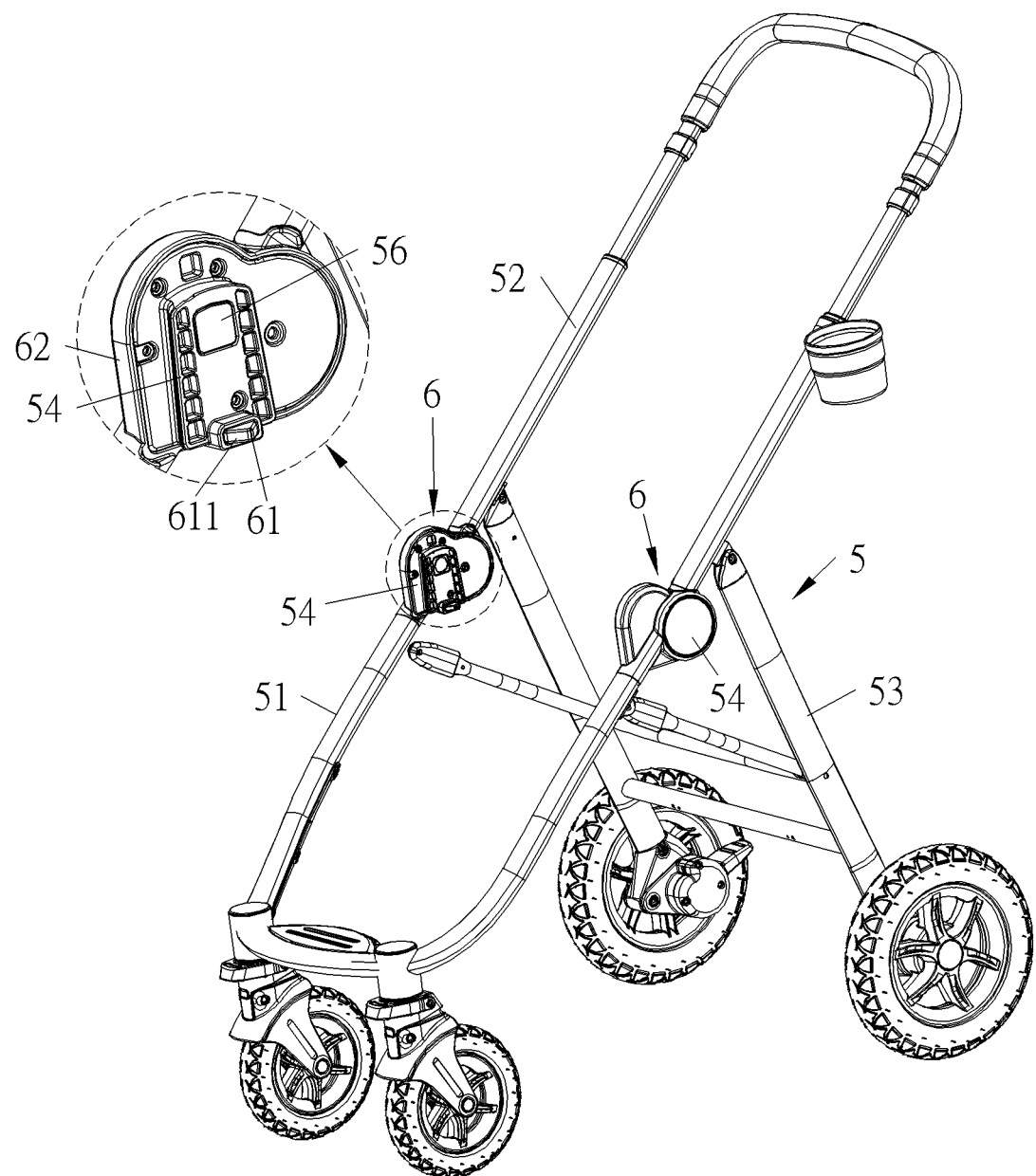
FIG. 13 is a schematic diagram of a baby stroller according to a sixth embodiment of the present invention.
Figure 14:
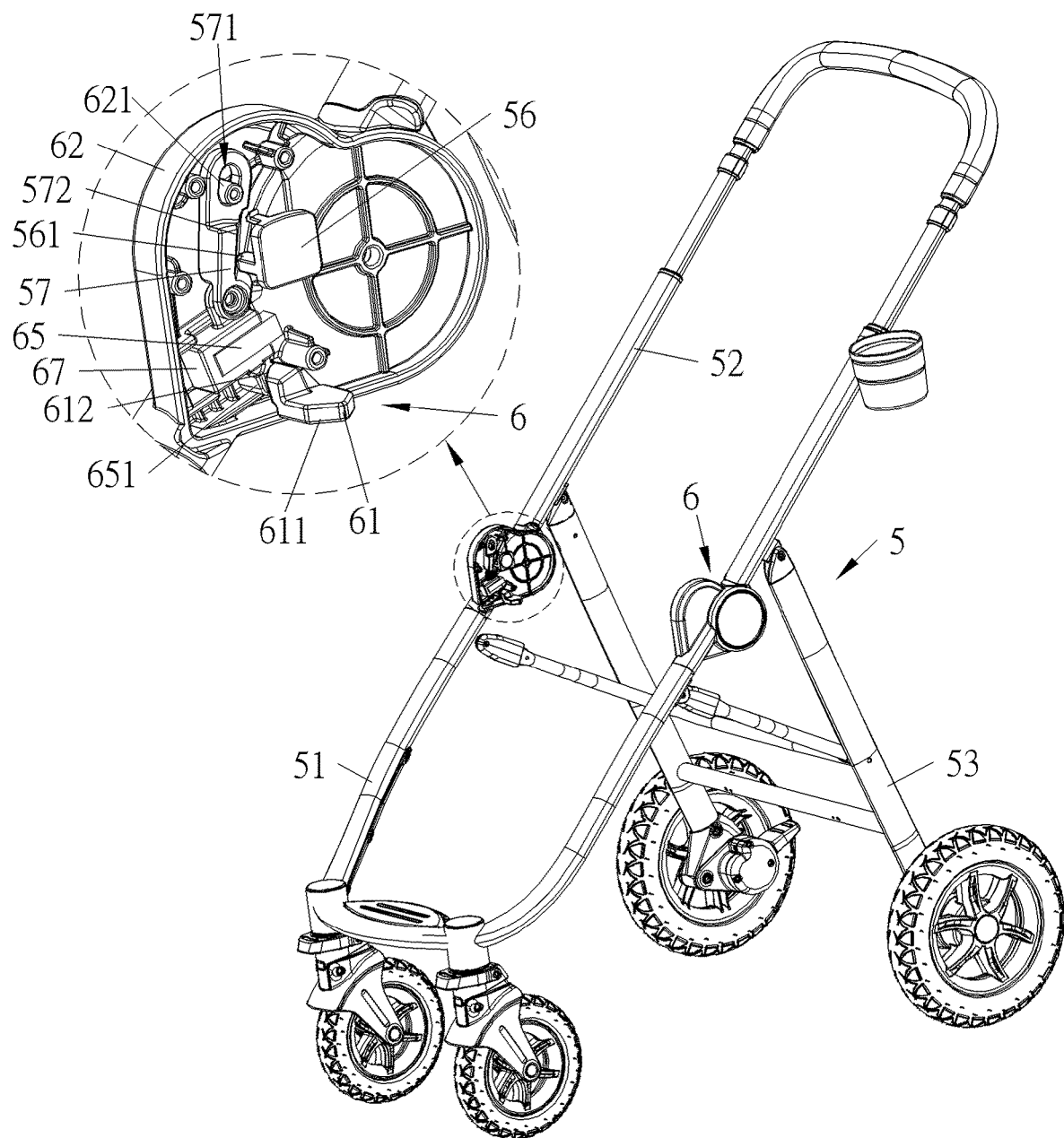
FIG. 14 is a partial diagram of the baby stroller without illustrating a covering component according to the sixth embodiment of the present invention.
Figure 15:
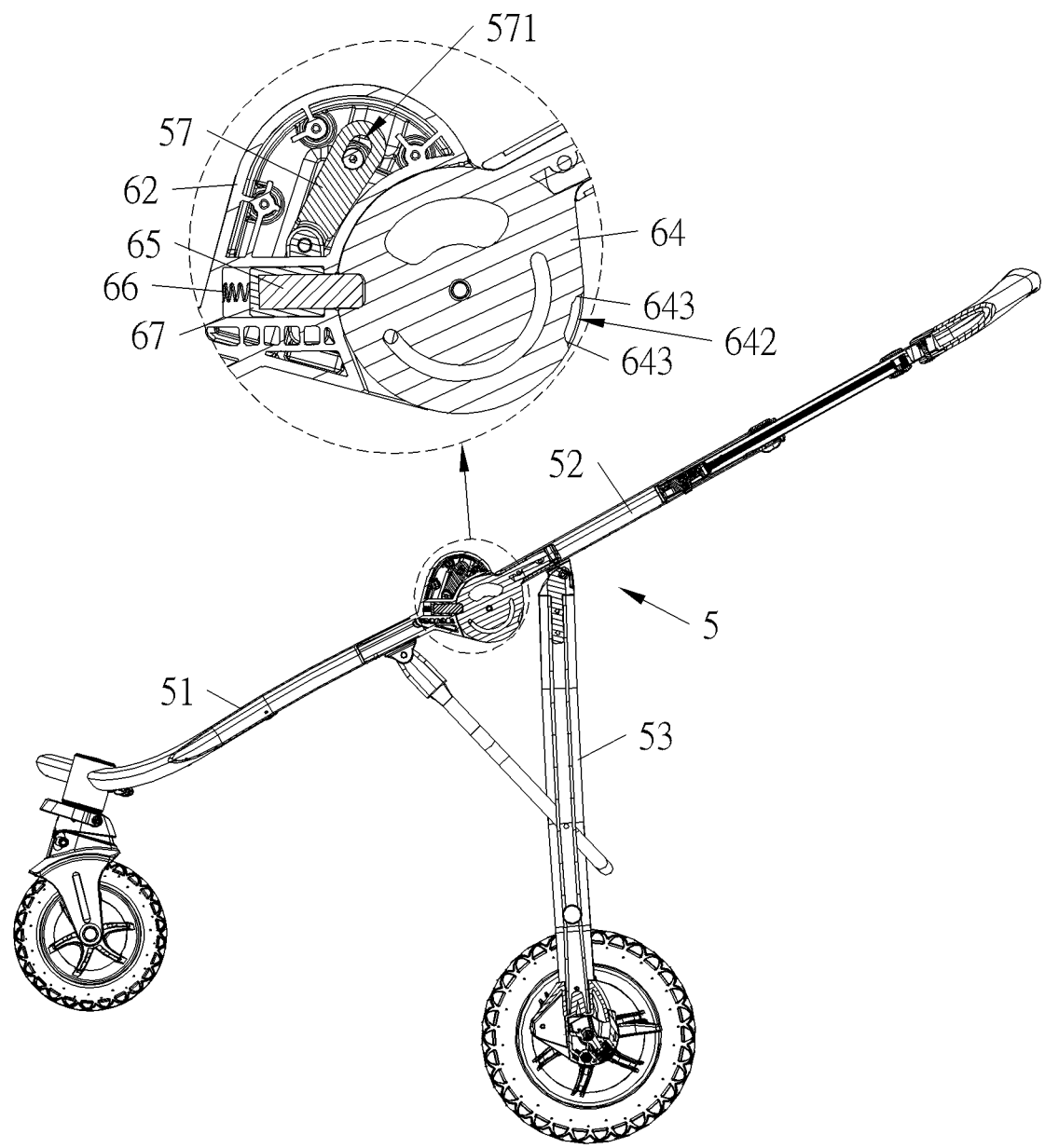
FIG. 15 is a sectional diagram of the baby stroller as a stroller frame is in an unfolded state according to the sixth embodiment of the present invention.
Figure 16:
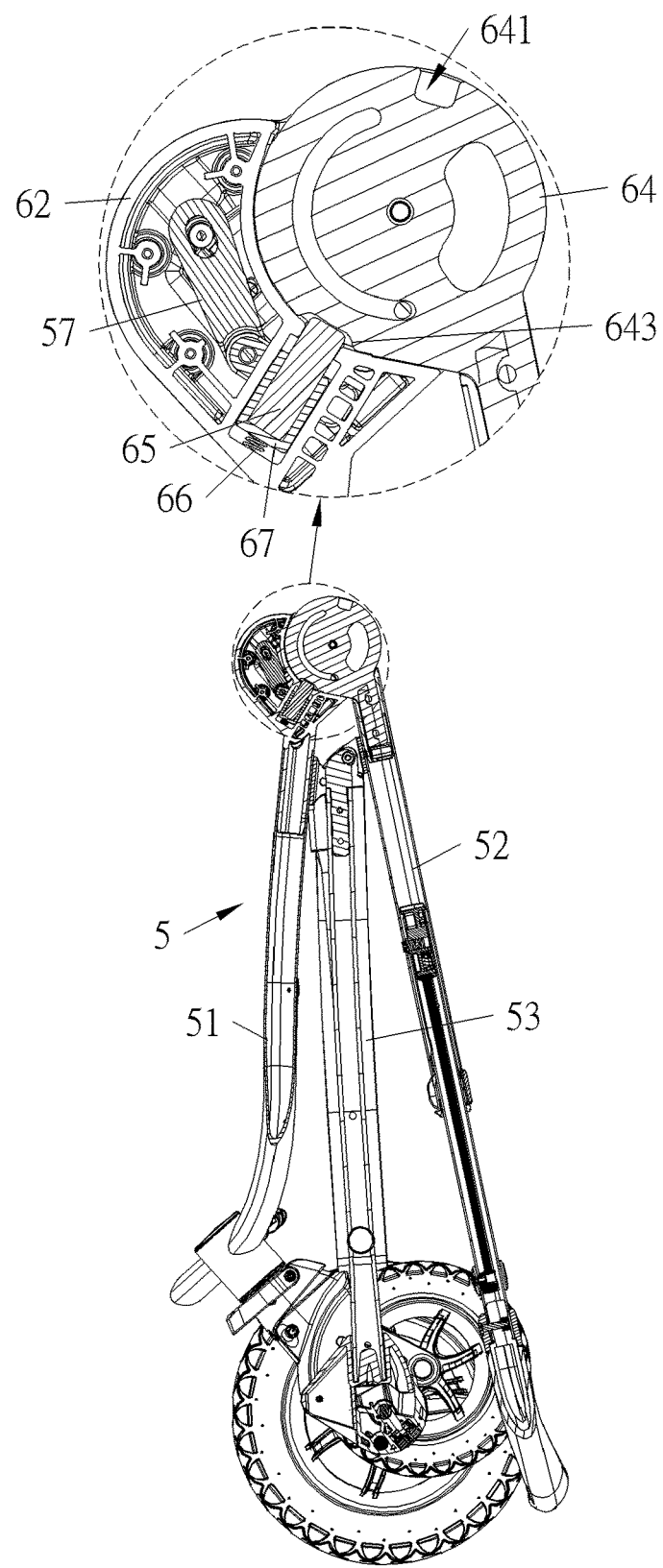
FIG. 16 is a sectional diagram of the baby stroller as a stroller frame is in the folded state according to the sixth embodiment of the present invention.

Please refer to FIG. 13 to FIG. 16. FIG. 13 is a schematic diagram of a baby stroller according to a sixth embodiment of the present invention. FIG. 14 is a partial diagram of the baby stroller without illustrating a covering component according to the sixth embodiment of the present invention. FIG. 15 is a sectional diagram of the baby stroller as a stroller frame 5 is in the unfolded state according to the sixth embodiment of the present invention. FIG. 16 is a sectional diagram of the baby stroller as the stroller frame 5 is in the folded state according to the sixth embodiment of the present invention. As shown in FIG. 13 to FIG. 16, in this embodiment, the stroller includes the stroller frame 5 and two folding mechanisms 6. Specifically, the stroller frame 5 includes a front support 51, a handle support 52 pivoted to the front support 51, and a rear support 53 pivoted to the handle support 52. The two folding mechanisms 6 are respectively disposed on two pivoting joints of the front support 51 and the handle support 52 for restraining or allowing a folding action of the stroller frame 5. As shown in FIG. 13, similar to the first embodiment, the stroller further includes two seat mounts 54 for allowing a seat to be mounted thereon. A driving component 61 of each folding mechanism 6 is slidably disposed on a lower portion of the corresponding seat mount 54. A driven slanted surface 611 is formed on an end of each driving component 61 exposed out of the corresponding seat mount 54. Furthermore, the stroller also includes two releasing components 56. Each releasing button 56 is disposed on an upper portion of the corresponding seat mount 54 for manual operation when the seat is detached from the stroller frame 5.

As shown in FIG. 14 and FIG. 15, each folding mechanism 6 includes a first fixing component 62, a second fixing component 64, a locking component 65, a resilient component 66 and a linking element 67. The two first fixing components 62 are respectively fixed on two upper ends of the front support 51. The two second fixing components 64 are respectively fixed on two lower ends of the handle support 52. Each first fixing component 62 is pivoted to the corresponding second fixing component 64. Each locking component 65 is disposed on the corresponding linking element 67, and each linking element 67 is slidably disposed on the corresponding first fixing component 62, so that each locking component 65 can be driven by the corresponding linking element 67 to slide relative to the corresponding first fixing component 62 during a sliding movement of the corresponding linking element 67. Preferably, the linking element 67 can be a sliding seat for accommodating the locking component 65. However, it is not limited thereto. An unfolding engaging slot 641 is formed on each second fixing component 64 for allowing the corresponding locking component 65 to insert therein, and each locking component 65 is aligned with the corresponding unfolding engaging slot 641 when the stroller frame 5 is unfolded to the unfolded state. Each resilient component 66 is disposed between the corresponding first fixing component 62 and the corresponding linking element 67 for providing a resilient force to push the corresponding linking element 67, to drive the corresponding locking component 65 to engage with the corresponding unfolding engaging slot 641. When the stroller frame 5 is in the unfolded state, each locking component 65 is driven to engage with the corresponding unfolding engaging slot 641, so that the folding action of the stroller frame 5 can be restrained.

A driving inclined surface 612 is formed on an end of each driving component 61 inside the corresponding seat mount 54. An inclined portion 651 is formed on an end of each linking element 67 and bent toward the corresponding driving component 61 for cooperating with the corresponding driving inclined surface 612. When each driving component 61 slides to push the corresponding linking element 67 by cooperation of the corresponding driving inclined surface 612 and the corresponding inclined portion 651, the corresponding locking component 65 can be driven by the corresponding linking element 67 to slide away from the corresponding second fixing component 64 and compress the resilient component 66. When each locking component 65 slides to disengage from the corresponding unfolding engaging slot 641, the folding action of the stroller frame 5 is allowed.

Preferably, a folding engaging slot 642 is formed on each second fixing component 64 and located at a position different from a position of the corresponding unfolding engaging slot 641, and a pushing slanted surface 643 is formed on an inner periphery of each folding engaging slot 642. As shown in FIG. 16, when the stroller frame 5 is folded to the folded state, each locking component 65 is aligned with the corresponding folding engaging slot 642 and can be driven to engage with the corresponding folding engaging slot 642 by the deformed resilient component 66, so that it maintains the unfolded stroller frame 5 and prevents an unintentional unfolding action of the stroller 5. When it is desired to unfold the stroller frame 5, it takes a force to separate the front support 51 from the handle support 52, so as to drive the two locking components 65 to disengage from the two folding engaging slots 642 by the two pushing slanted surfaces 643.

As shown in FIG. 14, each releasing button 56 pushes the corresponding linking element 67 to drive the corresponding locking component 65 to move by a releasing linking component 57. An end of each releasing linking component 57 is pivoted to the corresponding linking element 67. Another end of each releasing linking component 57 is connected to the corresponding first fixing component 62 by a long hole 571 and a pin 621 of the first fixing component 62. An abutting column 561 protrudes from each releasing button 56 toward the corresponding releasing linking component 57. An oblique surface 572 is formed on each releasing linking component 57. When each releasing button 56 is pressed, the corresponding abutting column 561 drives the corresponding releasing linking component 7 to move relative to the corresponding first fixing component 62 by contacting with the corresponding oblique surface 572, so as to push the corresponding linking element 67 to drive the corresponding locking component 65 to slide away from the corresponding second fixing component 64 for achieving a purpose of allowing the folding action of the stroller frame 5. However, it is not limited to this embodiment. In another embodiment, the oblique surface also can be formed on the releasing button.

It should be noticed that the aforementioned surfaces of the aforementioned embodiments, which includes the driving slanted surface, the driven inclined surface and etc., can be flat surfaces. However, it is not limited thereto. In another embodiment, the aforementioned surfaces also can be arc surfaces.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A baby stroller comprising:
a stroller frame comprising at least two supports, a first fixing component, a second fixing component and a locking component, the first fixing component being fixed on one of the at least two supports, the second fixing component being fixed on another one of the at least two supports and pivotally connected to the first fixing component, the locking component being movably disposed on the first fixing component and configured to engage with the second fixing component for restraining a folding action of the stroller frame; and
a child carrier disposed on the stroller frame and pivotable relative to the stroller frame, the child carrier being for providing a releasing force to the locking component for disengaging the locking component from the second fixing component to allow the folding action of the stroller frame during a pivotal movement of the child carrier relative to the stroller frame;
wherein the locking component is pivotally disposed on the first fixing component, and the child carrier is for providing the releasing force to the locking component, such that the locking component disengages from the second fixing component in a swinging manner.

2. The baby stroller of claim 1, wherein the stroller frame further comprises a releasing portion disposed on a surface of the stroller frame and corresponding to the locking component, the releasing portion is for receiving the releasing force and for transmitting the releasing force to the locking component to drive the locking component to disengage from the second fixing component when the releasing portion receives the releasing force.

3. The baby stroller of claim 2, wherein the releasing portion comprises a driving component disposed on the surface of the stroller frame and corresponding to the locking component for receiving the releasing force and for transmitting the releasing force to the locking component to drive the locking component to disengage from the second fixing component when the releasing portion receives the releasing force.

4. The baby stroller of claim 3, wherein the stroller frame further comprises at least one linking element disposed between the locking component and the driving component for receiving the releasing force transmitting from the driving component and for transmitting the releasing force to the locking component to drive the locking component to disengage from the second fixing component.

5. The baby stroller of claim 3, wherein at least one driven slanted surface is formed on the driving component, and the child carrier pushes the driving component by cooperation of the child carrier and the at least one driven slanted surface.

6. The baby stroller of claim 3, wherein the stroller frame further comprises a child carrier mount for allowing the child carrier to be mounted thereon, and the driving component is movably disposed on the child carrier mount and located beneath the child carrier.

7. The baby stroller of claim 6, wherein the releasing portion further comprises a releasing component disposed on the child carrier mount and corresponding to the locking component for receiving the releasing force and for transmitting the releasing force to the locking component to drive the locking component to disengage from the second fixing component for allowing the folding action of the stroller frame when the releasing component receives the releasing force.

8. The baby stroller of claim 7, wherein the baby stroller further comprises an operating component, the releasing component comprises a fixing end for allowing the operating component to be connected thereto, the operating component is for providing the releasing force to the locking component by the releasing component for allowing the folding action of the stroller frame when the child carrier does not rotate relative to the stroller frame.

9. The baby stroller of claim 7, wherein the releasing component is pivotally disposed on the child carrier mount, and the driving component is slidably disposed on the child carrier mount and partially located inside the child carrier mount.

10. The baby stroller of claim 9, wherein the locking component is pivotally disposed on the first fixing component, and a pivoting axis of the releasing component is perpendicular to a pivoting axis of the locking component.

11. The baby stroller of claim 3, wherein a driving inclined surface is formed on an end of the driving component for pushing the locking component to disengage the locking component from the second fixing component.

12. The baby stroller of claim 11, wherein an inclined portion is formed on the locking component and bent toward the driving component for cooperating with the driving inclined surface.

13. The baby stroller of claim 1, wherein the stroller frame further comprises a resilient component for biasing the locking component to engage with the second fixing component.

14. The baby stroller of claim 1, wherein an engaging portion protrudes from the second fixing component, and an engaging notch is formed on the locking component for engaging with the engaging portion.

15. A baby stroller comprising:
a stroller frame comprising at least two supports, a first fixing component, a second fixing component and a locking component, the first fixing component being fixed on one of the at least two supports, the second fixing component being fixed on another one of the at least two supports and pivotally connected to the first fixing component, the locking component being movably disposed on the first fixing component and configured to engage with the second fixing component for restraining a folding action of the stroller frame; and
a child carrier disposed on the stroller frame and pivotable relative to the stroller frame, the child carrier being for providing a releasing force to the locking component for disengaging the locking component from the second fixing component to allow the folding action of the stroller frame during a pivotal movement of the child carrier relative to the stroller frame;
wherein the locking component is slidably disposed on the first fixing component and slidable relative to the first fixing component along a direction perpendicular to a pivoting axis of the first fixing component and the second fixing component, and the child carrier is for providing the releasing force to the locking component, such that the locking component disengages from the second fixing component in a sliding manner.

16. The baby stroller of claim 15, wherein the stroller frame further comprises at least one linking element slidably disposed on the first fixing component, and the locking component is at least partially disposed inside the at least one linking element and slidable relative to the first fixing component by the at least one linking element.

17. The baby stroller of claim 15, wherein an unfolding engaging slot is formed on the second fixing component for allowing the locking component to insert therein, and the locking component is aligned with the unfolding engaging slot when the stroller frame is unfolded to an unfolded state.

18. The baby stroller of claim 15, wherein a folding engaging slot is formed on the second fixing component for allowing the locking component to insert therein, and the locking component is aligned with the folding engaging slot when the stroller frame is folded to a folded state.

19. The baby stroller of claim 18, wherein a pushing slanted surface is formed on an inner periphery of the folding engaging slot for pushing the locking component.

20. A baby stroller comprising:
a stroller frame comprising at least two supports, a first fixing component, a second fixing component and a locking component, the first fixing component being fixed on one of the at least two supports, the second fixing component being fixed on another one of the at least two supports and pivotally connected to the first fixing component, the locking component being movably disposed on the first fixing component and configured to engage with the second fixing component for restraining a folding action of the stroller frame; and
a child carrier disposed on the stroller frame and pivotable relative to the stroller frame, the child carrier being for providing a releasing force to the locking component for disengaging the locking component from the second fixing component to allow the folding action of the stroller frame during a pivotal movement of the child carrier relative to the stroller frame;
wherein the stroller frame comprises a child carrier mount for allowing the child carrier to be mounted thereon and a releasing component disposed on the child carrier mount for receiving the releasing force and for transmitting the releasing force to the locking component, so as to drive the locking component to disengage from the second fixing component for allowing the folding action of the stroller frame when the releasing component receives the releasing force.

21. The baby stroller of claim 20, wherein the releasing component is pivotally disposed on the child carrier mount.

22. The baby stroller of claim 21, wherein the releasing component comprises a pushing inclined surface contacting with the locking component.

23. The baby stroller of claim 22, wherein the stroller frame further comprise a driving component movably disposed on the child carrier mount, and a contact point of the releasing component and the locking component and a contact point of the driving component and the locking component are located at different locations.

24. The baby stroller of claim 21, wherein a pivoting axis of the releasing component is perpendicular to a pivoting axis of the locking component.

25. The baby stroller of claim 20, wherein the releasing component is configured to be pushed by the pivotal movement of the child carrier, when the releasing component is pushed by the pivotal movement of the child carrier, the releasing component moves toward the locking component to drive the locking component, so as to allow the folding action of the stroller frame.

26. The baby stroller of claim 20, further comprising an operating component connected to the releasing component, the releasing component being configured to be driven by the operating component when the operating component is operated, when the releasing component is driven by the operating component, the releasing component moving toward the locking component to drive the locking component, so as to allow the folding action of the stroller frame.

* * * * *